（12）United States Patent
Sasaki

(10) Patent No.: US 9,534,935 B2
(45) Date of Patent: Jan. 3, 2017

(54) ENCODER

(71) Applicant: CANON PRECISION INC., Hirosaki-shi (JP)

(72) Inventor: Ryo Sasaki, Yokohama (JP)

(73) Assignee: CANON PRECISION, INC., Aomori-Ken (JP)

( * ) Notice: Subject to any disclaimer, the term of this patent is extended or adjusted under 35 U.S.C. 154(b) by 124 days.

(21) Appl. No.: 14/619,421

(22) Filed: Feb. 11, 2015

(65) Prior Publication Data

US 2015/0233737 A1 Aug. 20, 2015

(30) Foreign Application Priority Data

Feb. 14, 2014 (JP) ................................ 2014-026113
Mar. 14, 2014 (JP) ................................ 2014-052658

(51) Int. Cl.
*G01D 5/34* (2006.01)
*G01D 5/347* (2006.01)

(52) U.S. Cl.
CPC ................................ *G01D 5/34707* (2013.01)

(58) Field of Classification Search
CPC ............. G01D 5/2451–5/2458; G01D 5/34707
USPC ........................................ 250/231.13–231.19
See application file for complete search history.

(56) References Cited

U.S. PATENT DOCUMENTS 7,449,678 B2 * 11/2008 Ito ..................... G01D 5/34746
250/231.13
2006/0267822 A1 11/2006 Ito
2012/0205527 A1 8/2012 Yoshida et al.

FOREIGN PATENT DOCUMENTS

| EP | 2908101 A2 | 8/2015 |
| JP | 2010-223631 A | 10/2010 |
| JP | 2012-103230 A | 5/2012 |
| JP | 2013-36945 A | 2/2013 |

OTHER PUBLICATIONS

EESR, counterpart of EP application No. 16155436.5, Aug. 1, 2016.

\* cited by examiner

*Primary Examiner* — Thanh Luu
(74) *Attorney, Agent, or Firm* — Canon USA, Inc. IP Division

(57) ABSTRACT

An encoder includes a scale including an origin detecting pattern, an origin detector, and a processor. The origin detector includes a plurality of detecting element groups including a first, second, third, and fourth detectors. The first and second detectors and the third and fourth detectors are symmetrically arranged to a center of each detecting element group, respectively. A part of the origin detecting pattern having a physical characteristic different from an origin peripheral part is shorter than each detecting element group. The origin detector outputs a first signal from the first and third detectors, and a second signal from the second and fourth detectors. The processor outputs a fifth signal based on a third signal from the first signal and a first threshold, and a fourth signal from the second signal and a second threshold as an origin signal.

17 Claims, 37 Drawing Sheets

ENCODER

BACKGROUND OF THE INVENTION

Field of the Invention

The invention relates an encoder including a detecting function of an origin position.

Description of the Related Art

An encoder is currently used as a means for detecting a position and a velocity. An example of the encoder is an incremental encoder. Though a detecting position of the incremental encoder is accumulated by a counter when a scale and a sensor are relatively displaced, the detecting position is lost because the counter is reset just after supplying power. Thus, an operation for detecting an origin position is performed by relative displacement between the scale and the sensor when the power is supplied, and the counter is reset when the origin position is realized by an origin signal. This is origin detection. After origin detection, position detection from the origin position becomes performable.

In Japanese Patent Laid-Open No. 2013-36945, a photodiode array identical to a photodiode array of a displacement detecting sensor is used as an origin detecting sensor, and a plurality of patterns for generating an origin signal, which have the same pitch as a pattern for generating a displacement detecting signal, are used as a scale pattern. And when an origin signal processor processes an output signal acquired from them, an origin region is determined and an origin signal is output.

However, in Japanese Patent Laid-Open No. 2013-36945, if the photodiode arrays of the origin detecting sensor are arranged larger than a length corresponding to 2 periods of an output signal of the origin detection sensor, the origin region may be mistaken. Because an output signal in a region other than the origin region can be partially satisfied with a condition regarded as an origin by the origin signal processor.

In encoder disclosed in Japanese Patent Laid-Open No. 2012-103230, a digital origin signal is output based on an origin detecting signal reflected by a pattern for generating an origin signal and acquired by binarizing an output signal, which changes at a predetermined gradient and are entered into a detector.

However, in Japanese Patent Laid-Open No. 2012-103230, when the origin detecting signal varies on a high voltage side or a low voltage side by a noise, an output phase from a binarizing circuit changes and an origin position may be mistaken.

SUMMARY OF THE INVENTION

In view of the foregoing, the invention provides an encoder capable of suppressing false detection of an origin signal.

An encoder as one aspect of the invention includes a scale including an origin detecting pattern, an origin detector reading the origin detecting pattern, and a processor outputting an origin signal. The origin detector includes a plurality of detecting element groups. Each detecting element group includes at least a first detector, a second detector, a third detector, and a fourth detector. The first and second detectors and the third and fourth detectors are symmetrically arranged to a center of each detecting element group, respectively. The origin detecting pattern is configured so that a length along a detecting direction of a part, which is detected by the origin detector and has a physical characteristic different from an origin peripheral part, is shorter than a length along the detecting direction of each detecting element group. The origin detector outputs a first signal based on the first and third detectors, and a second signal based on the second and fourth detectors. The processor acquires a third signal by processing the first signal and a first threshold, and a fourth signal by processing the second signal and a second threshold, and outputs a fifth signal acquired by processing the third and fourth signals as the origin signal.

Additionally, an encoder as another aspect of the invention includes a scale including an origin detecting pattern, an origin detector reading the origin detecting pattern, and a processor outputting an origin signal. The origin detector includes a plurality of detecting element groups. Each detecting element group includes at least a first detector, a second detector, a third detector, and a fourth detector. The origin detector is configured so that a first signal sensitivity of detectors distributed at a central part of the plurality of detecting element group is larger than a second signal sensitivity of detectors distributed at a peripheral part of the plurality of detecting element group. The origin detecting pattern has an origin pattern so that a length along a detecting direction of the origin pattern, which is detected by the origin detector and has a physical characteristic different from an origin peripheral part, is larger than a length along the detecting direction of each detecting element group. The origin detector outputs a first signal based on the first and third detectors, and a second signal based on the second and fourth detectors. The processor acquires a third signal by processing the first signal and a first threshold, and a fourth signal by processing the second signal and a second threshold, and outputs a fifth signal acquired by processing the third and fourth signals as the origin signal.

Further features of the present invention will become apparent from the following description of exemplary embodiments with reference to the attached drawings.

DESCRIPTION OF THE PREFERRED EMBODIMENTS

Figure 1:
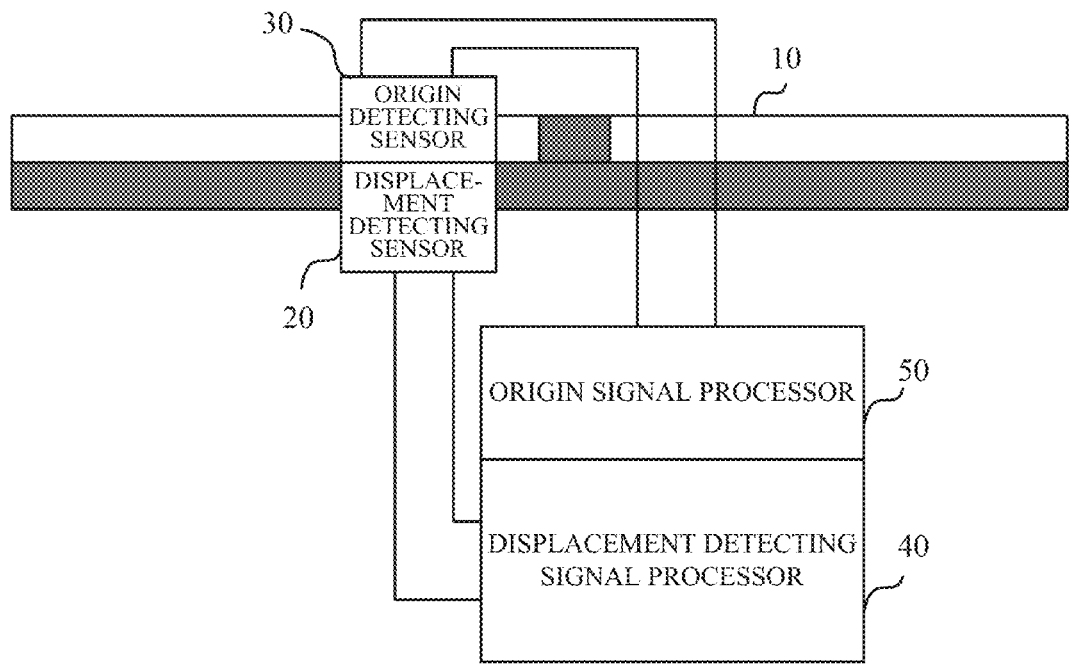
FIG. 1 is a schematic diagram illustrating a configuration of an encoder in Embodiment 1.

Exemplary embodiments of the invention will be described below with reference to the accompanied drawings. In each of the drawings, the same elements will be denoted by the same reference numerals and the duplicate descriptions thereof will be omitted.

Embodiment 1

In this embodiment, a linear type encoder detecting moving amounts in a uniaxial direction is explained as example. FIG. 1 is a schematic diagram illustrating a configuration of an encoder in this embodiment. The encoder includes a scale 10, a displacement detecting sensor (displacement detector) 20, an origin detecting sensor (origin detector) 30, a displacement detecting signal processor 40, and an origin signal processor 50. The encoder of this embodiment is a reflective type optical incremental encoder detecting relative displacement between the scale 10, and the displacement detecting sensor 20 or the origin detecting sensor 30. The scale 10 is attached along a uniaxial moving direction of a measured object, and further the displacement detecting sensor 20 is attached to a fixing member so as to detect displacement of the measured object. When a positional relation between the scale 10 and the origin detecting sensor 30 is positioned at an origin position, an origin signal from the origin detecting sensor 30 is sent to the displacement detecting signal processor 40 as a digital pulse.

Figure 2:
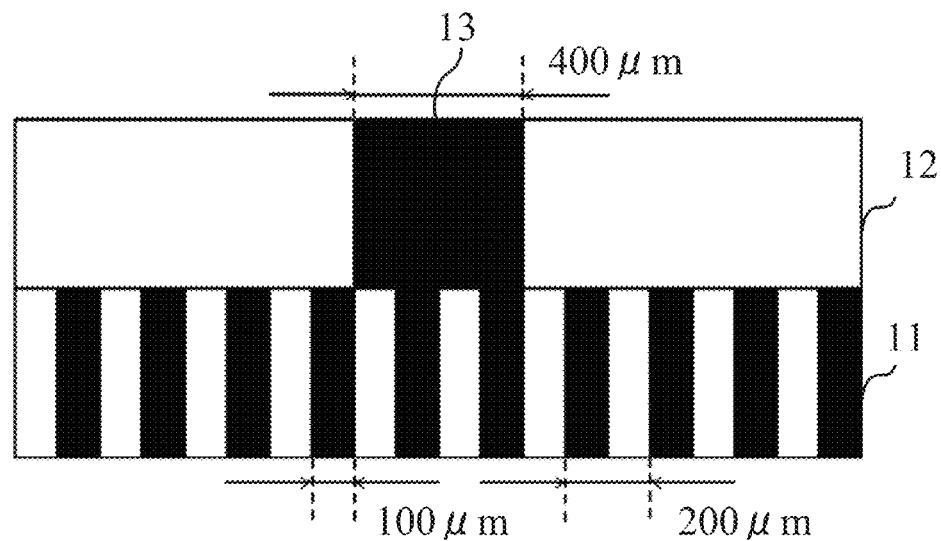
FIG. 2 is a schematic diagram illustrating tracks of a scale.

The scale 10 includes two tracks 11, 12 as illustrated in FIG. 2. The track 11 is used for displacement detection, and the track 12 is used for origin detection. In each track, a black part is a reflecting part, and a white part is a non-reflecting part. A period of the track 11 is 200 μm, and a reflecting part and a non-reflecting part are alternately arranged at 100 μm. A reflecting part 13, whose length in a detecting direction is 400 μm, is arranged at a center of the track 12.

Figure 3:
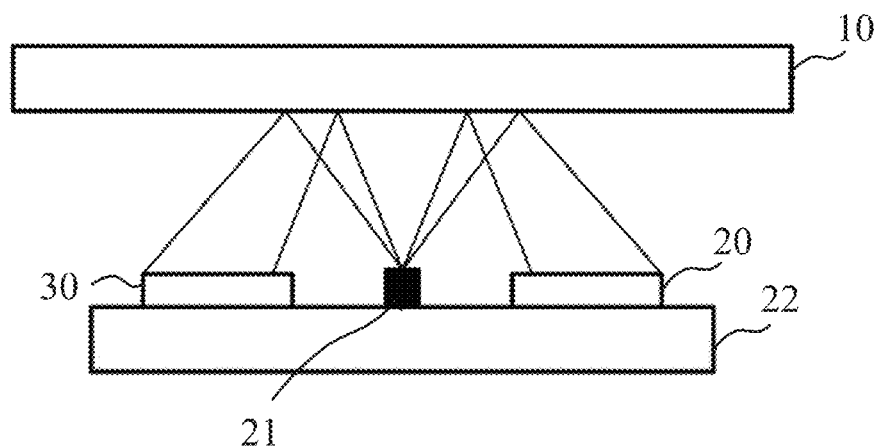
FIG. 3 is a schematic diagram illustrating an optical system.

The displacement detecting sensor 20, the origin detecting sensor 30, and a light source 21 are mounted on a mounting substrate 22 as illustrated in FIG. 3. The displacement detecting sensor 20 receives a reflected light of a light with which the track 11 is irradiated from the light source 21, and the origin detecting sensor 30 receives a reflected light of a light with which the track 12 is irradiated from the light source 21. This configuration is a divergent light flux configuration where a parallel light flux lens tying light flux parallel to each other is not existed between a light source and a scale. The divergent light flux configuration is a configuration where a light emitted from a light source is emitted so as to have a uniform spread without being parallel or concentrating on a single point. In this embodiment, an image of a pattern having a width P on the scale 10 is enlarged to become a width 2P on each sensor. Though each sensor is mounted on the same mounting substrate 22 in this embodiment, each sensor may be mounted on a different substrate. Additionally, in this embodiment, the same light source 21 is used relative to each sensor, but a different light source may be used relative to each sensor. Moreover, in this embodiment, displacement detection and origin detection are optically performed, but they may be magnetically performed.

Figure 4:
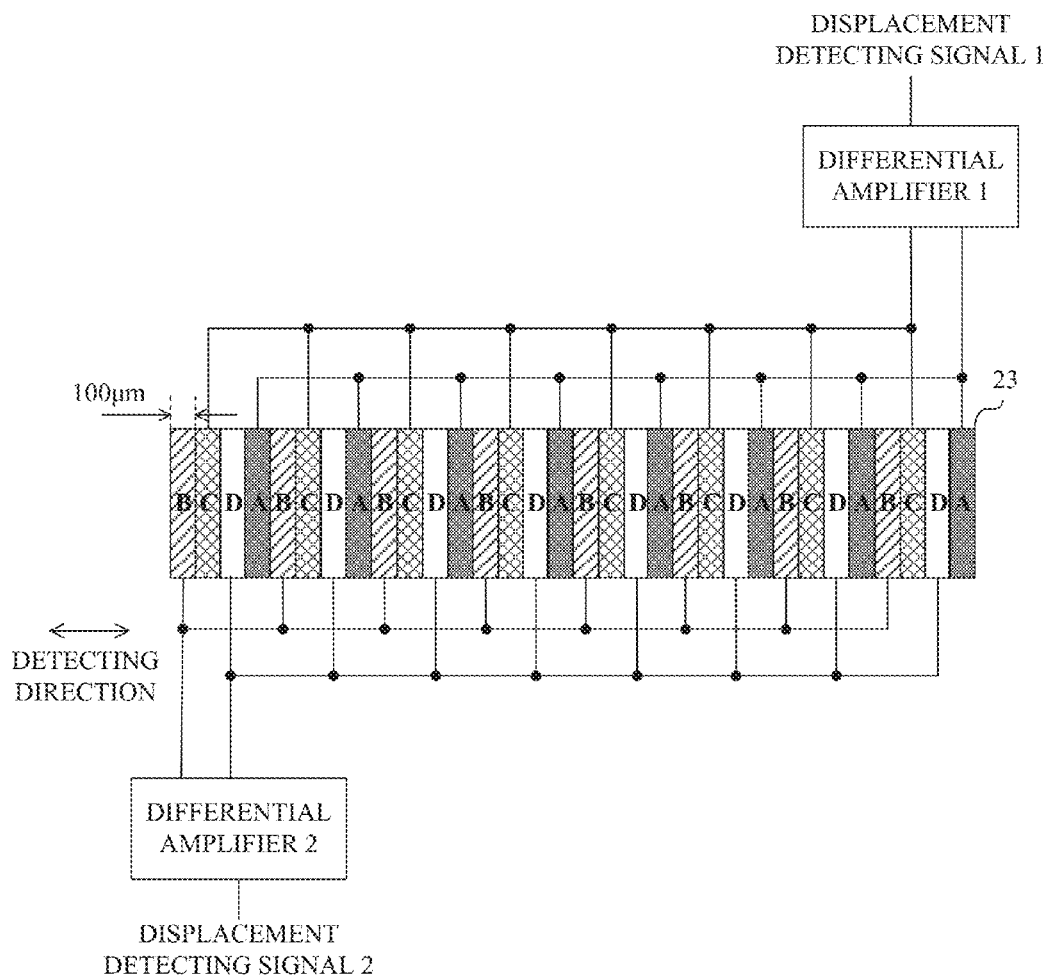
FIG. 4 is a schematic diagram illustrating detecting blocks of a displacement detecting sensor.

The displacement detecting sensor 20 includes detecting blocks as illustrated in FIG. 4. In FIG. 4, light receiving elements A-D output voltages proportional to light receiving quantity. A light receiving element B, a light receiving element C, a light receiving element D, and a light receiving element A are arranged in order from an end, and eight periods of this repeating unit is arranged on a light receiving part 23. Each length of the light receiving elements A-D in a displacement detecting direction is 100 μm, and a length of the light receiving part 23 is 3200 μm.

A differential amplifier 1 takes a difference between voltages output from the light receiving elements A, C on the basis of the central voltage, and a differential amplifier 2 takes a difference between voltages output from the light receiving elements B, D on the basis of the central voltage. An output of the differential amplifier 1 is a displacement detecting signal 1, and an output of the differential amplifier 2 is a displacement detecting signal 2. When VA-VD respectively represent each output voltage of light receiving elements A-D, V1 represents an output voltage value of the differential amplifier 1 (first signal), V2 represents an output voltage value of the differential amplifier 2 (second signal), and Voffset represents the central voltage, the first and second signals V1 and V2 are represented by the following expressions (A) and (B).

$$V1 = (VA - VC) + Voffset \quad (A)$$

$$V2 = (VB - VD) + Voffset \quad (B)$$

Output voltages VA-VD varies based on a change of a detected physical characteristic. Since an optical encoder is used in this embodiment, the detected physical characteristic is reflecting light quantity.

The track 11 in the scale 10 is patterns so as to change brightness in accordance with a period 200 μm. A reflected light from the track 11 is thus enlarged two times on the light reflecting part 23 and becomes an image whose brightness changes in accordance with a period 400 μm, which is equal to the arrangement period of the light receiving elements A-D on the light reflecting part 23.

Based on the above relation, a positional relation between the light receiving elements A, B, and a positional relation between C, D, the light receiving elements C and D output a phase difference signal having a phase difference of 180° from the light receiving element A and a phase difference signal having a phase difference of 180° from the light receiving element B, respectively.

From this relation, the light receiving elements A-D are regarded as a set of light receiving element group. A group represents a minimum constitutional unit of light receiving elements so as to output the displacement detecting signals 1, 2 from the displacement detecting unit 20. A phase difference between the displacement detecting signals 1, 2 is 90°. When relative displacement between the scale 10 and the displacement detecting sensor 20 is performed, light receiving quantity of the light receiving elements A-D changes according to displacement and the displacement detecting signals 1, 2 are output as sinusoidal wave signals.

Figure 5:
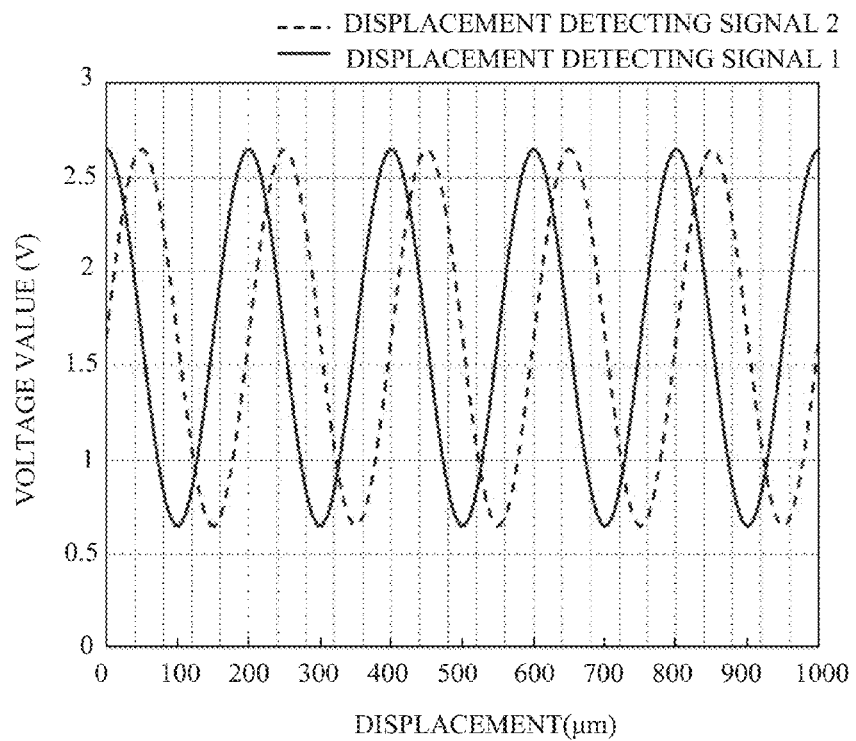
FIG. 5 is a schematic diagram illustrating a signal from a displacement detecting sensor.

The displacement detecting signals 1, 2 are illustrated in FIG. 5 when the scale 10 relatively moves by 1000 μm with respect to the displacement detecting sensor 20. In FIG. 5, the abscissa axis denotes displacement and the ordinate axis denotes a voltage value. As described above, since the reflected light from the scale 10 becomes a sinusoidal wave signal being the arrangement period of the light receiving elements A-D on the light reflecting part, a period of each displacement detecting signal also becomes 200 μm which is the period of the track 11. Additionally, since the displacement detecting signals 1, 2 mutually have 90° phase differences, phase difference between the displacement detecting signals 1, 2 becomes 50 μm which is 90° phase differences of 200 μm period. A power supply of the displacement detecting sensor 20 is 3.3V, but the central voltage becomes 1.65V which is ½ Vcc because the differential amplifiers 1, 2 take a differential based on the central voltage relative to the power supply. The displacement detection signals 1, 2 swing between the low and high voltage sides on the basis of the central voltage. The amplitude changes according to light quantity and a positional relation between a sensor and a scale. The amplitude in this embodiment is 2.0 Vp-p.

Figure 6:
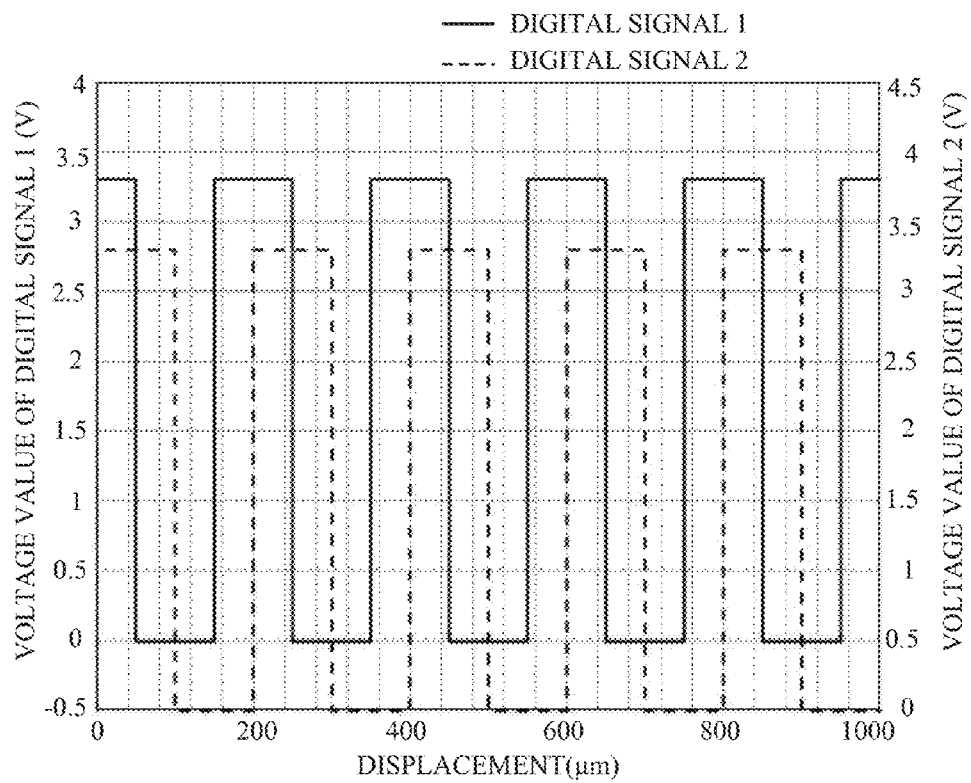
FIG. 6 is a schematic diagram illustrating a signal acquired by binarizing a signal from a displacement detecting sensor.

The displacement detecting signal processor 40 detects displacement based on two phase difference signals. The displacement detecting signal processor 40 binarizes two phase difference signals and counts for displacement detection every period. FIG. 6 is a schematic diagram illustrating binary signals acquired by binarizing the displacement detection signals 1, 2. In FIG. 6, a digital signal 1 is a binary signal acquired by binarizing the displacement detection signal 1, and a digital signal 2 is a binary signal acquired by binarizing the displacement detection signal 2. Both waveforms of digital signals 1, 2 rise at every 200 μm which is the period of the displacement detection signals 1, 2. The displacement detection signal processor 40 determines a displacement direction from combinations of rises of the digital signals 1, 2, and increases/decreases counts at every period.

Figure 7:
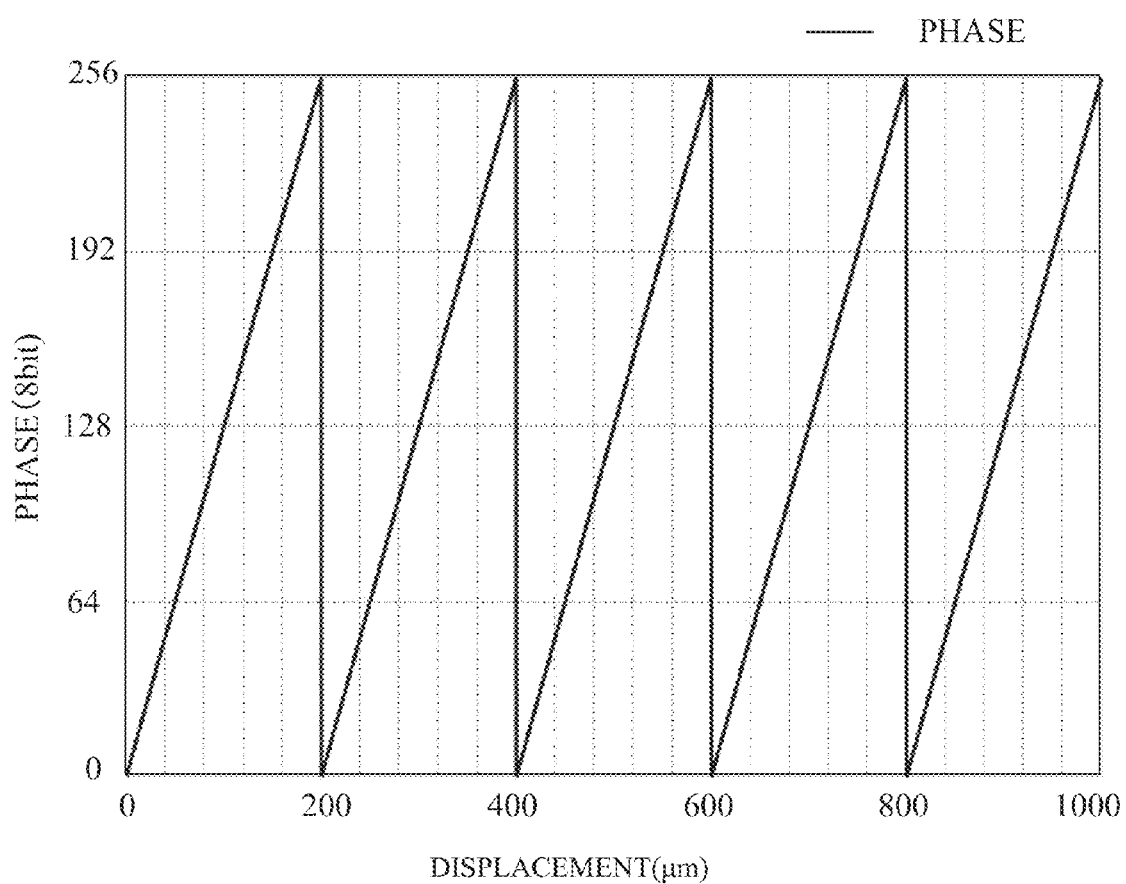
FIG. 7 is a schematic diagram illustrating a phase signal acquired from a signal from a displacement detecting sensor.

Additionally, for displacement detection in the period, the displacement detecting signal processor 40 incorporates a voltage value of the displacement detecting signal as a digital value, and carries out an arc tangent operation based on two phase difference signals. FIG. 7 illustrates a phase value (by setting 2π to 256) when an arc tangent operation of the displacement detecting signals 1, 2 is carried out. In FIG. 7, the abscissa axis denotes displacement and the ordinate axis denotes a phase in a sinusoidal wave. A phase changes 0-255 in a sinusoidal wave period, and is repeated when there are a plurality of periods. In other words, when a phase reaches 255, next phase becomes 0. In this embodiment, since a period is 200 µm, the above repeat repeats five times when the scale 10 relatively moves by 1000 µm with respect to the displacement detecting sensor 20.

Displacement in one period is acquired by dividing a phase calculated by an arc tangent operation by 256 corresponding to 2π. Detection displacement is acquired by the following expression (1), which combines the acquired displacement with the binarized digital signals 1, 2. Position denotes detection displacement, cnt denotes a count value in each period of the displacement detection signals 1, 2, and θ denotes a phase in a sinusoidal wave period acquired by an arc tangent operation of the displacement detection signals 1, 2.

$$Position=(cnt+\theta/256)\times 200 \text{ (um)} \quad (1)$$

Figure 8A:
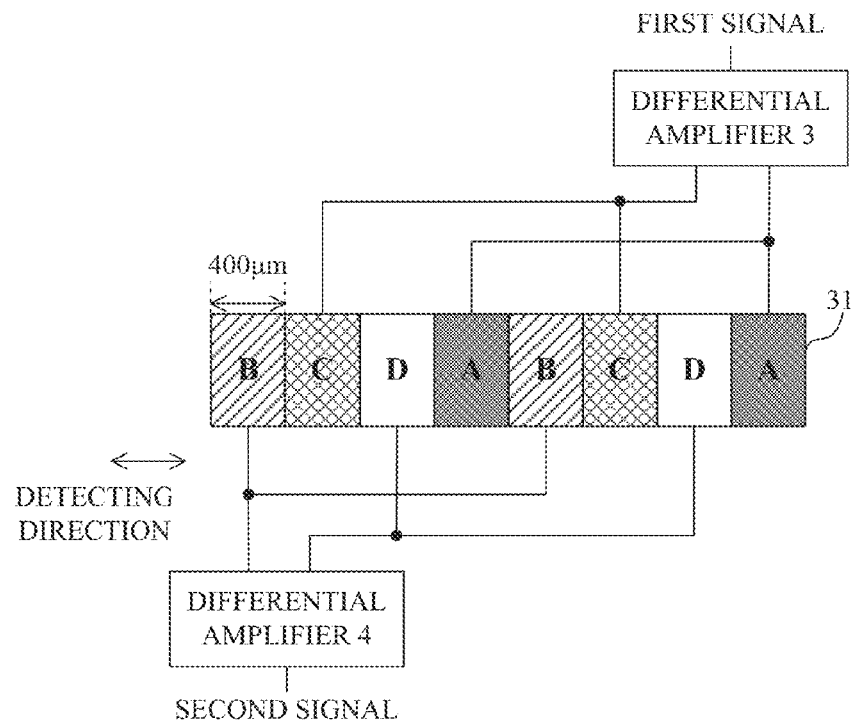
FIGS. 8A and 8B are schematic diagrams illustrating detecting blocks of an origin detecting sensor.
Figure 8B:
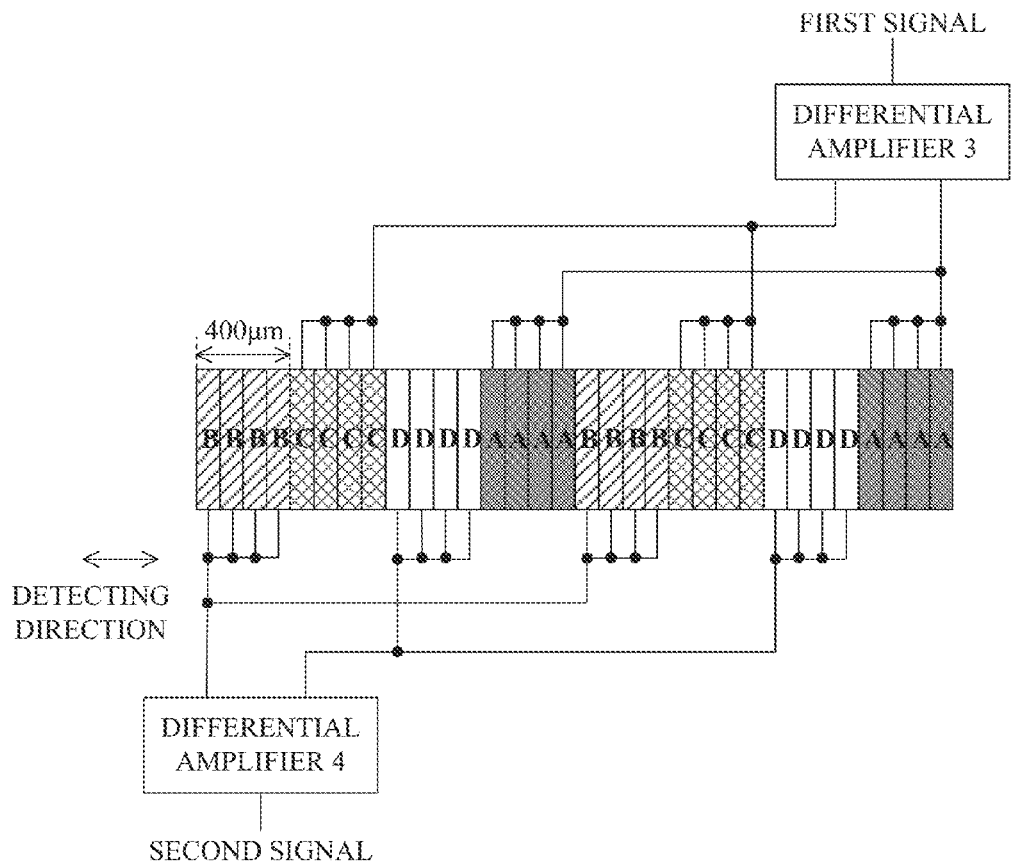

Next, origin detection in this embodiment is explained. The origin detection sensor 30 includes detection blocks as illustrated in FIG. 8A. In FIG. 8A, light receiving elements (detector) A, B, C, D output voltages proportional to light receiving quantity. The light receiving element B, the light receiving element C, the light receiving element D, and the light receiving element A are arranged in order from an end, and two periods of this light receiving element array group (detecting element group) are arranged on a light receiving part 31. Each length of the light receiving elements A-D in a detecting direction is 400 µm, and a length of the light receiving part 31 in the detection direction is 3200 µm. The light receiving elements A-D are respectively regarded as one element in the origin detecting sensor 30 of this embodiment, but a part where a plurality of elements are arranged along the detecting direction so as to connect an output from each element may be regarded as one light receiving element as illustrated in FIG. 8B.

A differential amplifier 3 takes a difference between voltages output from the light receiving elements A, C on the basis of the central voltage, and a differential amplifier 4 takes a difference between voltages output from the light receiving elements B, D on the basis of the central voltage. An output of the differential amplifier 3 is a first signal, and an output of the differential amplifier 4 is a second signal.

When the length in the detecting direction of the light receiving part 31 of the origin detecting sensor 30 is x, a phase difference between the first and second signals is x/8 on the light receiving part 31, which corresponds to x/16 on the scale, from the arrangement of FIG. 8A. This represents that the phase difference between the first and second signals is 400 µm on the light receiving part 31, in other words, 200 µm on the scale.

A first threshold and a second threshold are prepared as a reference signal so as to detect an origin position from the first and second signals. These are used so as to determine whether or not the first and second signals are respectively signals on an origin.

Figure 9:
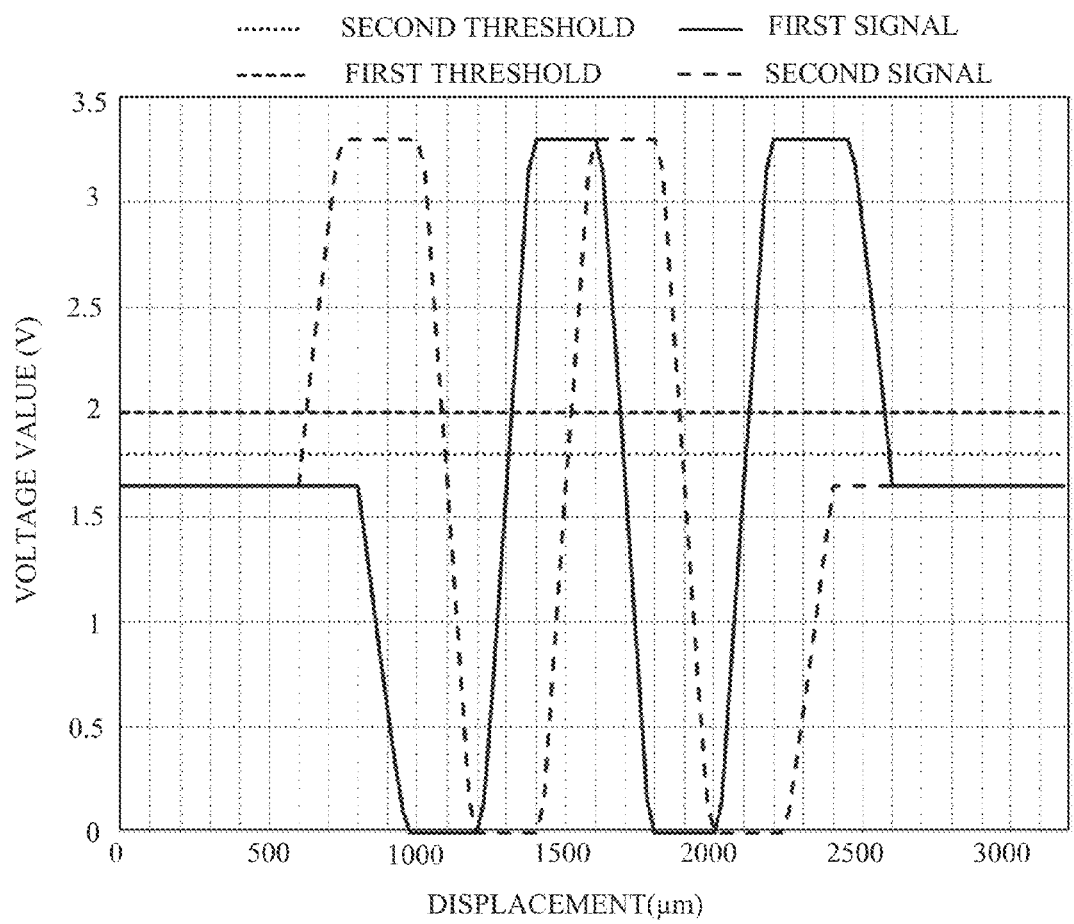
FIG. 9 is a schematic diagram illustrating a first signal, a second signal, a first threshold, and a second threshold of Embodiment 1.

In this configuration, FIG. 9 is a schematic diagram illustrating the first and second signals and the first and second thresholds when the origin detecting sensor 30 reads the track 12 including the reflecting part 13, whose width in the detecting direction is 400 µm. In FIG. 9, the abscissa axis denotes displacement, and the ordinate axis denotes a voltage value. A power supply of the origin detecting sensor 30 is 3.3V similar to the displacement detecting sensor 20. Additionally, the central voltage becomes 1.65V being ½ Vcc because the differential amplifiers 3, 4 take a differential based on the central voltage relative to the power supply. The first and second signals swing between the low and high voltage sides on the basis of the central voltage. The amplitude changes according to light quantity and a positional relation between a sensor and a scale, and swings between 0-3.3V in this embodiment.

Since the origin detecting sensor 30 includes two light receiving element array groups comprising the light receiving elements A-D as illustrated in FIG. 8A, two periods of first and second signals being a response output to the reflecting part 13 of the origin detecting sensor 30 are output. In a detecting direction, the light receiving elements A, B connected with non-inverting input terminals of the differential amplifiers 3, 4, and the light receiving elements C, D connected with inverting input terminals of the differential amplifiers 3, 4 are symmetrically arranged relative to a center of the light receiving element array group, respectively. Additionally, the light receiving elements A, B are arranged outside of the light receiving element array group, and the light receiving elements C, D are arranged inside thereof. The light receiving elements A, B, which serves so as to output the first and second signals on a high voltage side from the central voltage when the light receiving elements receiving light, are adjacent at the center of the light receiving part 31, and are discretely arranged in other region. Both first and second signals are output on a high voltage side from the central voltage when the reflected light from the reflecting part 13 is incident to the center part of the light receiving elements. Additionally, in the other than the center of the light receiving elements, the second signal is output on a low voltage side from the central voltage when the first signal is output at a high voltage side from the central voltage, and the second signal is output on a high voltage side from the central voltage when the first signal is output on a low voltage side from the central voltage.

Figure 10:
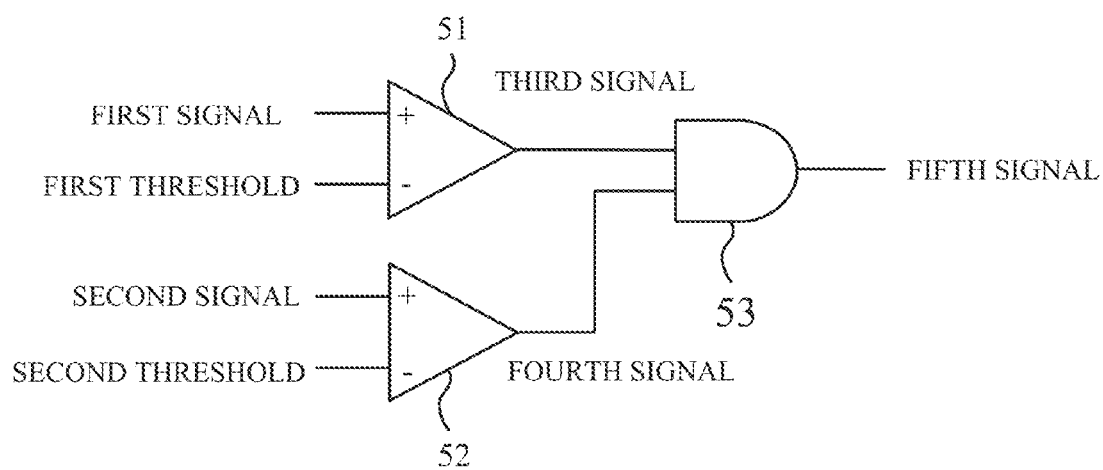
FIG. 10 is a schematic diagram illustrating a processing part of an origin detecting processor.
Figure 11:
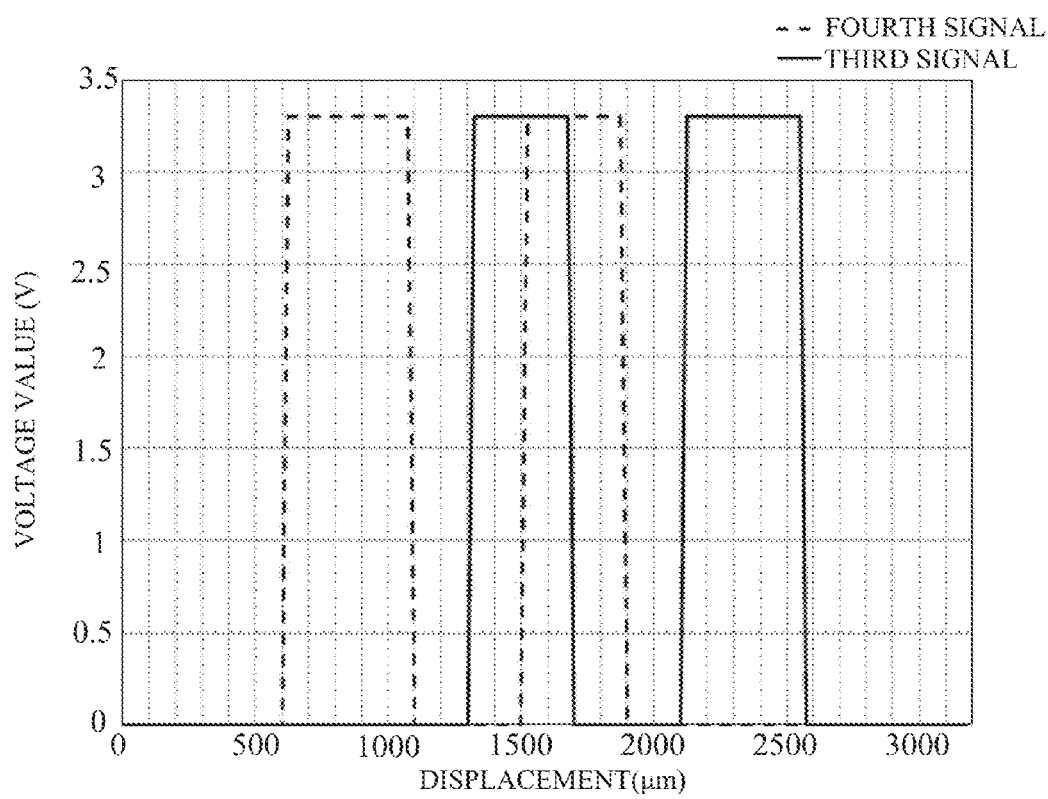
FIG. 11 is a schematic diagram illustrating a third signal, and a fourth signal.
Figure 12:
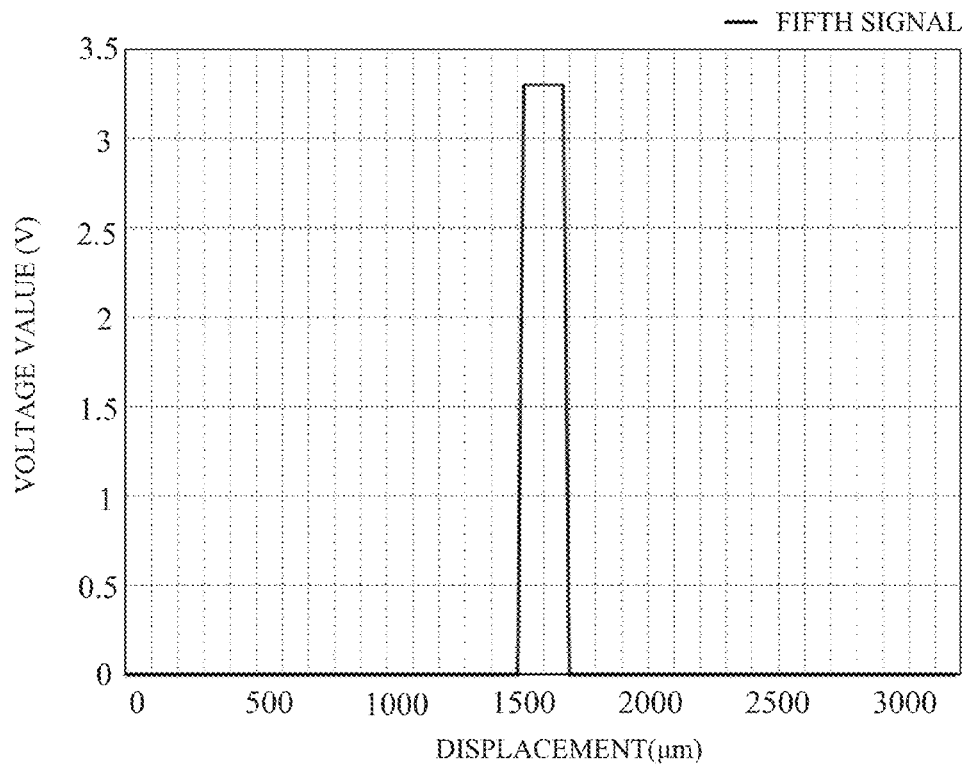
FIG. 12 is a schematic diagram illustrating a fifth signal.

The origin signal processor 50 includes a processing part as illustrated in FIG. 10. A comparator 51 outputs a third signal by comparing the first signal and the first threshold, and a comparator 52 outputs a fourth signal by comparing the second signal and the second threshold. The comparator 51 outputs a high-level signal if the first signal is higher than the first threshold, otherwise outputs a low-level signal. The comparator 52 also outputs a high-level signal if the second signal is higher than the second threshold, otherwise outputs a low-level signal. FIG. 11 is a schematic diagram illustrating the third and fourth signals. Since two periods of each signal are output, an output from each comparator is two periods of a binarized output. An AND circuit 53 calculates the logical product of the third and fourth signals and outputs a fifth signal. Since both the first and second signals become high-level signals when the reflected light from the reflecting part 13 is incident to the center part of the light receiving part 31, the fifth signal being one pulse of an origin signal as illustrated in FIG. 12 is generated by being calculated the logical product by the AND circuit 53. In this embodiment, when the fifth signal becomes high-level signal, the displacement detecting signal processor 40 determines that a measured object is positioned at an origin position and then resets a count value at every period to 0. In this embodiment, the origin signal processor 50 is comprised of the comparators 51, 52 and the AND circuit 53, but may be comprised of any configuration if a signal similar to the fifth signal can be acquired.

Figure 13:
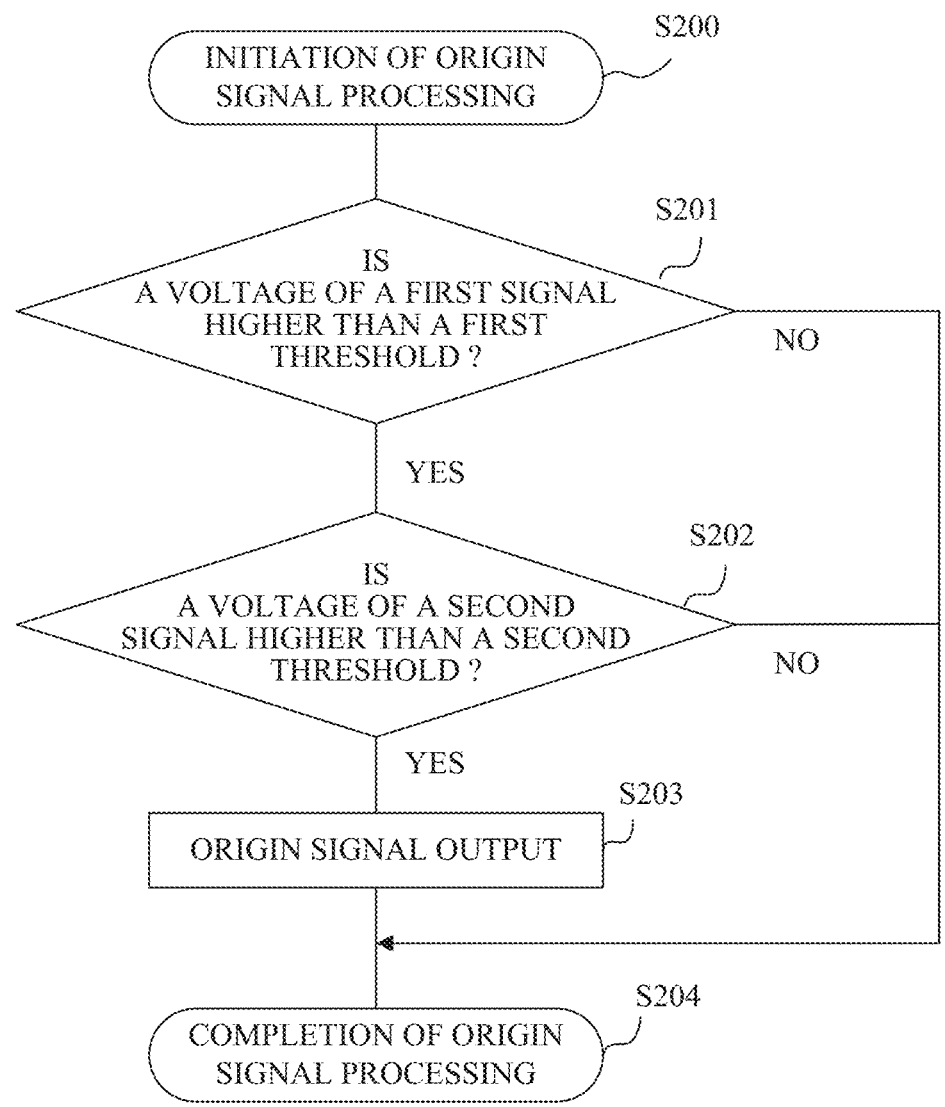
FIG. 13 is a flowchart of an origin signal processing.

Regarding the above process, a specific example is explained using a flowchart of FIG. 13. After initiating an origin signal processing in a step S200, whether a voltage of the first signal is higher than the first threshold is determined (step S201). If the voltage of the first signal is higher than the first threshold, the process proceeds to next determination, otherwise finishes (step S204). In a step S202, whether a voltage of the second signal is higher than a second threshold is determined. If the voltage of the second signal is higher than the second threshold, an origin signal is output (step S203). In this embodiment, the determination about the voltage of the second signal and the second threshold is determined after the determination about the voltage of the first signal and the first threshold is determined, but these determinations may be in reverse order. Additionally, satisfying both determinations may be determined after determining these determinations at the same time.

As previously mentioned, the fifth signal is activated when both the first and second signals have higher voltages than the central voltage. The first and second thresholds may be thus set as the following expressions (2), (3), respectively. Voffset1, Voffset2 are the central voltages of the first and second signals, respectively, and Vref1, Vref2 are the first and second thresholds, respectively. Additionally, Vcross is a voltage, where the first and second signals intersect, higher than the central voltage (hereinafter referred to as "cross point voltage").

$$Voffset1 < Vref1 < Vcross \quad (2)$$

$$Voffset2 < Vref2 < Vcross \quad (3)$$

These expressions represent that the first and second thresholds being reference signals are only determined by the central voltage and the cross point voltage, and is not affected by a signal from the peripheral part. The central voltage and the cross point voltage respectively have fluctuation components such as light quantity fluctuation, origin pattern fluctuation, and amplifier fluctuation. Thus, the expressions (2), (3) can be rewritten as the following expressions (4), (5), respectively. Vom represents a central voltage fluctuation factor, and vcm represents a cross point voltage fluctuation factor.

$$Voffset1 + Vom < Vref1 < Vcross - Vcm \quad (4)$$

$$Voffset2 + Vom < Vref2 < Vcross - Vcm \quad (5)$$

Additionally, in the configuration which calculates a differential between voltages from the light receiving elements arranged at different locations each other, the cross point voltage changes based on a length in the detecting direction of the reflecting part 13 (hereinafter referred to as "origin pattern length"). Because the first and second signals, which are output values of the differential amplifiers 3, 4 of FIGS. 8A and 8B, are calculated by the following expressions (6), (7). V1 represents the first signal, V2 represents the second signal, and Voffset represents the central voltage.

$$V1 = (VA - VC) + Voffset \quad (6)$$

$$V2 = (VB - VD) + Voffset \quad (7)$$

Output voltages VA-VD varies based on a change of a detected physical characteristic. Since an optical encoder is used in this embodiment, the detected physical characteristic is reflecting light quantity. For example, regarding reflecting light quantity at a certain position, if (reflecting light quantity incident to the light reflecting element A)>(reflecting light quantity incident to the light reflecting element C) is satisfied, the first signal is output on the high voltage side from the central voltage value. If (reflecting light quantity incident to the light reflecting element A)<(reflecting light quantity incident to the light reflecting element C) is satisfied, the first signal is output on the low voltage side from the central voltage value. If (reflecting light quantity incident to the light reflecting element A)=(reflecting light quantity incident to the light reflecting element C) is satisfied, the value of the first signal becomes the central voltage. Since the length of the reflecting light in the detecting direction changes by a length of the origin pattern in the detecting direction (hereinafter referred to as "origin pattern length"), the cross point voltage also changes by the origin pattern length. Additionally, in the processing system calculating the logical product of the same phase signals on the high voltage side from the central voltage, the larger the cross point voltage is, the bigger an origin detecting margin is. Thus, the origin pattern length needs to be properly set so as to acquire high origin detecting margin.

Figure 14A:
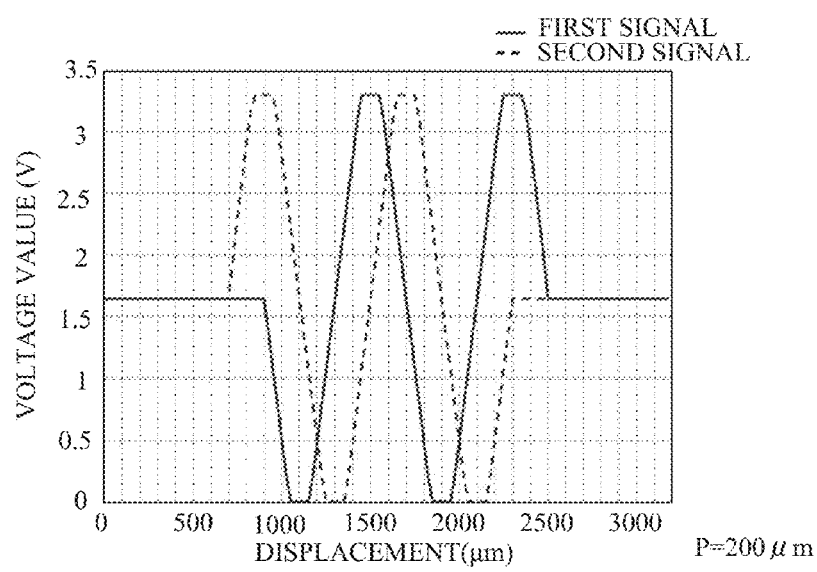
FIGS. 14A-14C are schematic diagrams respectively illustrating a relation between a first and second signals and an origin pattern length.
Figure 14B:
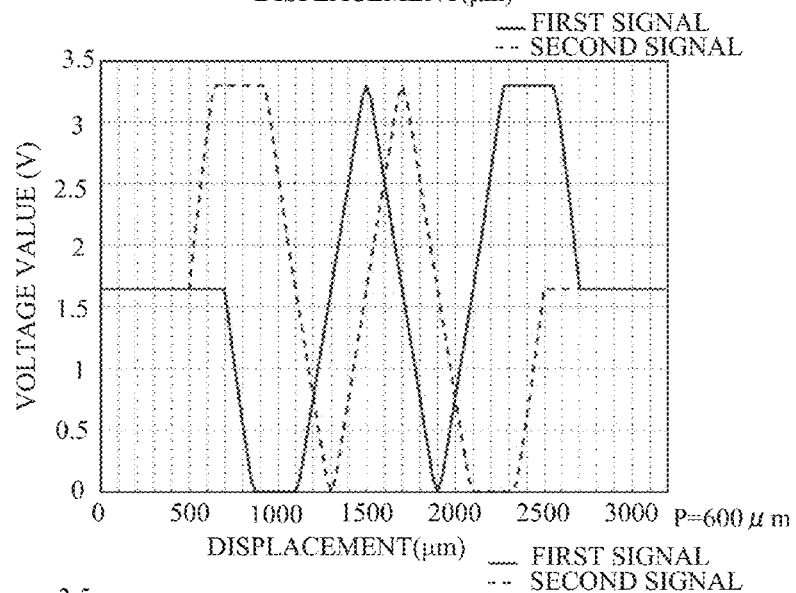
Figure 14C:
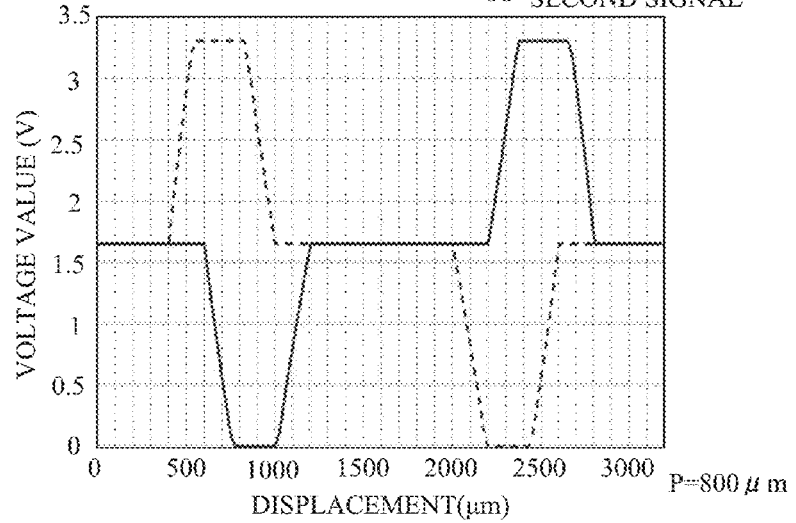
Figure 15:
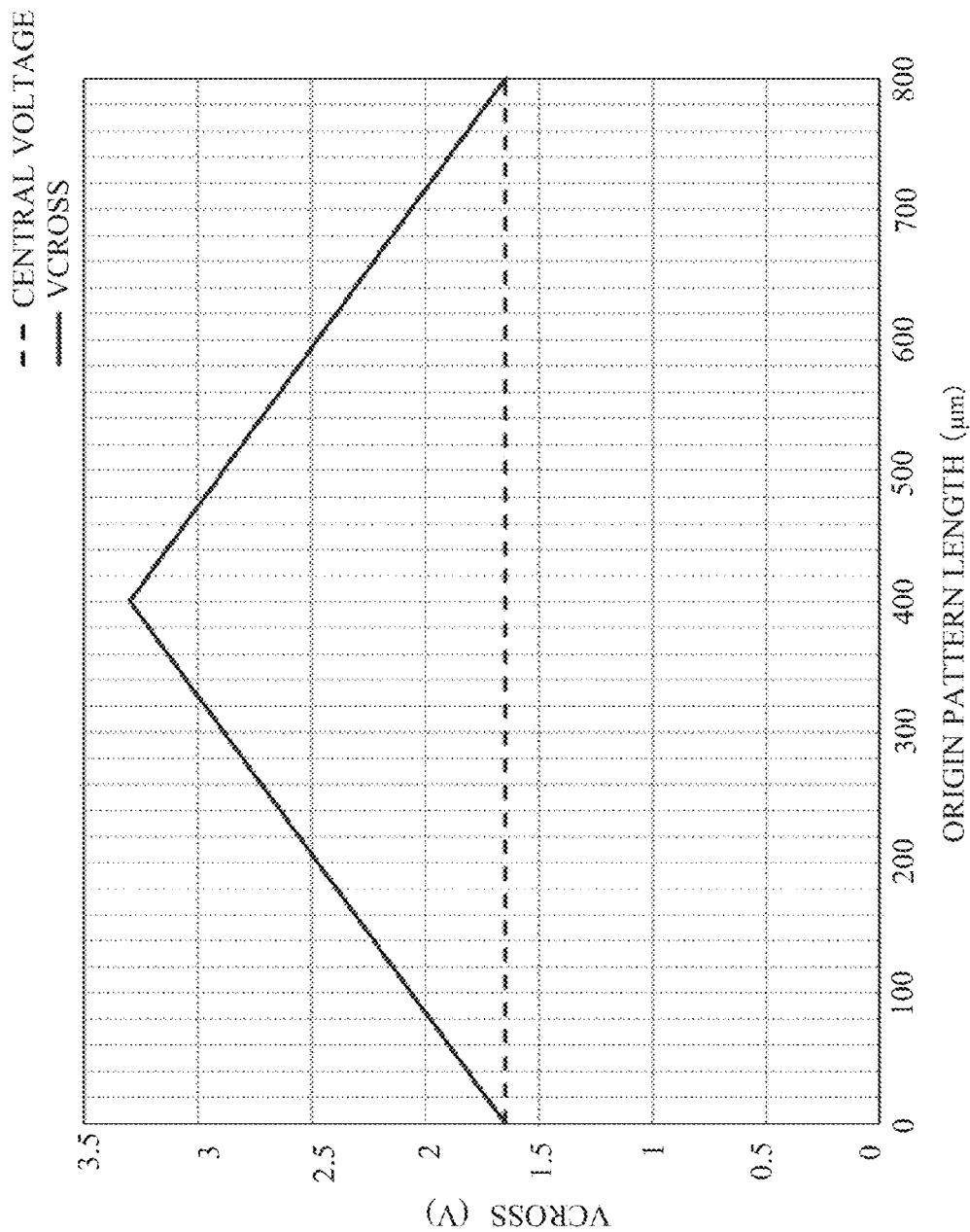
FIG. 15 is a schematic diagram illustrating a relation between an origin pattern length and a cross point voltage.

FIGS. 14A-14C illustrates a relation between the first and second signals and the origin pattern, and FIG. 15 illustrates a relation between the origin pattern length and a cross point voltage value. In FIGS. 14A-14C, the abscissa axis denotes displacement, and the ordinate axis denotes a voltage value. FIGS. 14A-14C represents the first and second signals when the origin pattern lengths are 200 μm, 600 μm, 800 μm, respectively. In FIG. 15, the abscissa axis denotes the origin pattern length, and the ordinate axis denotes a voltage. Additionally, in FIG. 15, a solid line represents the cross point voltage, and a broken line represents the central voltage. In FIG. 15, when the origin pattern length becomes larger from 0 μm, the cross point voltage becomes gradually larger from the central voltage. When the origin pattern length is 400 μm where the reflected light from the origin pattern is irradiated to both the light receiving elements A, B adjacent to each other at the center of the light receiving part 31, the cross point voltage is the maximum. From then the cross point voltage decreases, and is again equal to the central voltage when the origin pattern length is 800 μm, where the reflected light from the origin pattern is irradiated to all light receiving elements in one light receiving element array group.

The origin pattern length may be thus less than 800 μm, where the cross point voltage is higher than the central voltage and the length in the detecting direction of the reflected light from the reflecting part 13 of the track 12 is less than the length in the detecting direction of one light receiving element array group. In this embodiment, the origin pattern length is set to 400 μm, where the cross point voltage is the maximum.

In the above configuration, preferable origin detection hardly causing wrong recognition of an origin by a signal from other than the origin is performable.

In this embodiment, the reflective configuration that the displacement detecting sensor 20, the origin detecting sensor 30, and the light source 21 are arranged on the same surface and, displacement and an origin position are detected by receiving the reflected light from the scale 10 is explained. However, the invention can be applied to the transmissive configuration that each sensor is provided on a plane different from a plane on which the light source 21 is provided and the scale 10 is provided between the light source 21 and each sensor.

Additionally, in this embodiment, a sensor different from the origin detecting sensor for displacement detection is used. Since the configuration of the origin detecting sensor is the same configuration as the displacement detecting sensor except for an arrangement number of the light receiving element array group in this embodiment, the origin detecting sensor of the invention may be used for displacement detection.

Moreover, an origin detection processing is performed using the circuit in this embodiment, but may be performed using a software if a signal similar to the fifth signal can be acquired.

Embodiment 2

Figure 16:
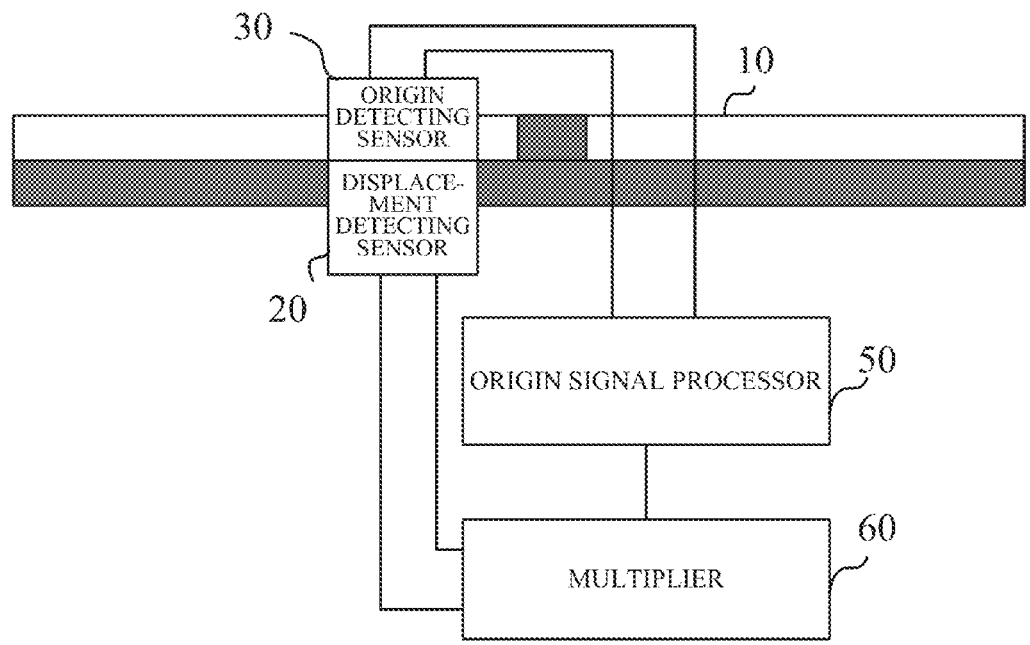
FIG. 16 is a schematic diagram illustrating a configuration of an encoder in Embodiment 2.
Figure 17:
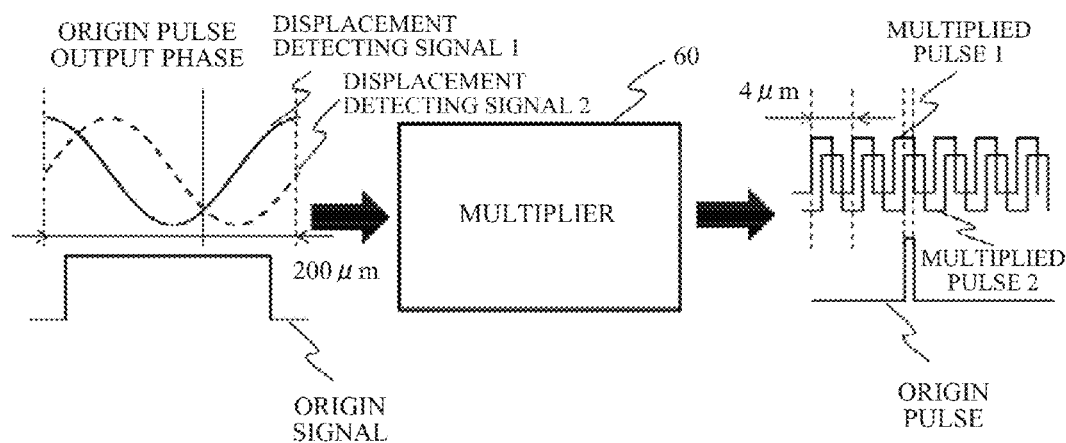
FIG. 17 is a schematic diagram relating to an operation of a multiplier.

In this embodiment, a multiplier 60 is used instead of a displacement detecting signal processor 40 of Embodiment 1. FIG. 16 is a schematic diagram illustrating the configuration of an encoder in this embodiment. Additionally, FIG. 17 is a schematic diagram relating to an operation of the multiplier. The method of origin detecting processing is the same as Embodiment 1.

In FIG. 17, the multiplier 60 outputs digital signals, which are 50-divided displacement detecting signals 1, 2, as multiplied pulses 1, 2. Pulse length of each multiplied pulse is then 4 μm. An origin pulse synchronizes with edges of the multiplied pulses 1, 2, and is output at an origin pulse output phase when an origin signal is input. The origin pulse output phase is a phase where the displacement detecting signals 1, 2 are the same at a low voltage side from the central voltage.

Figure 18:
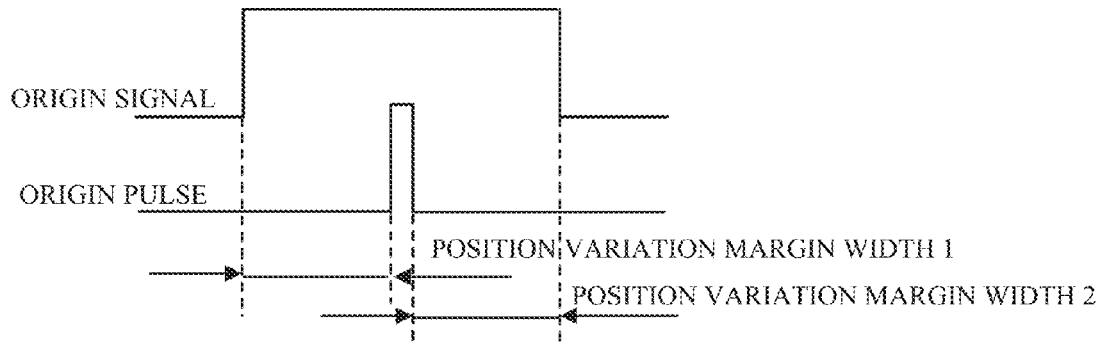
FIG. 18 is a schematic diagram illustrating a relation among an origin signal, an origin pulse, and a position variation margin width.
Figure 18:
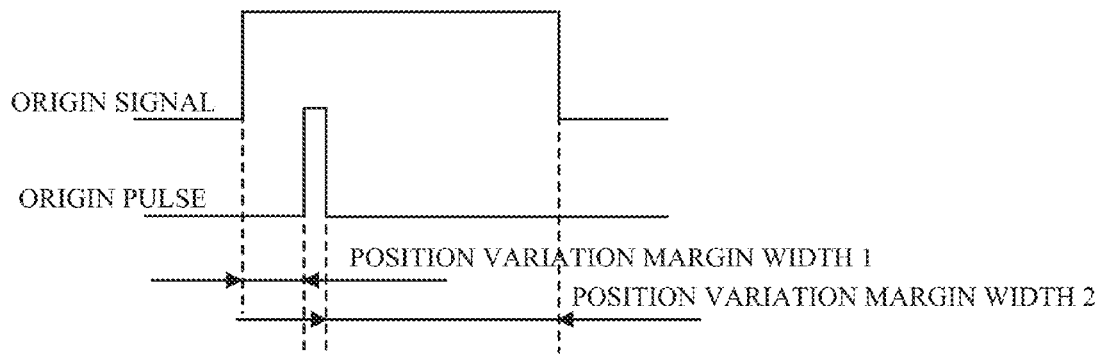

FIG. 18 is a schematic diagram illustrating a relation among the origin signal, the origin pulse, and position variation margin width. In FIG. 18, when the origin pulse output phase rises at the center of the raised origin signal, the position variation margin widths 1, 2 are almost the same. This means having the same resistance characteristics relative to position variations in both directions. Meanwhile, when the origin pulse output phase is localized relative to the raised the origin, a resistance of the position variation margin width 1 is inferior compared to the position variation margin width 2. This means that the displacement detecting sensor 20 and the origin detecting sensor 30 have position variation margins localizing in one direction.

A way of dealing with phase differences between an output phase of the displacement detecting sensor 20 and an origin signal output from the origin signal processor 50 is explained. The origin pulse output phase is localized relative to the raised origin signal because the position variation margin width decreases by the phase differences. As a result, the origin pulse is not output at desired position.

In this embodiment, an output position of the origin signal relative to the origin pulse output phase is adjusted. The raised width of the fifth signal, which is the original signal, is determined by the first and second thresholds. For example, if a signal having 100 μm of the raised width is acquired, the first and second thresholds become an intermediate value between the central voltage and the cross point voltage. Because the phase difference between the first and second signals determined by the arrangement of the light receiving elements is always 200 μm at the central voltage, decreases by setting larger thresholds from the central voltage, and becomes 0 at an intersectional position where the first and second signals intersect. Since the first and second signals are linear from the central voltage to the cross point voltage, a relation between the origin signal raised time and the threshold is represented as the following expression (8). λ represents the origin signal raised width, and X represents the phase difference between the first and second signals at the central voltage. For simplification, Vref1=Vref2=Vref and Voffset1=Voffset2=Voffset are satisfied.

$$\lambda = X \times \frac{Vcross - Vref}{Vcross - Voffset} \quad (8)$$

Figure 19A:
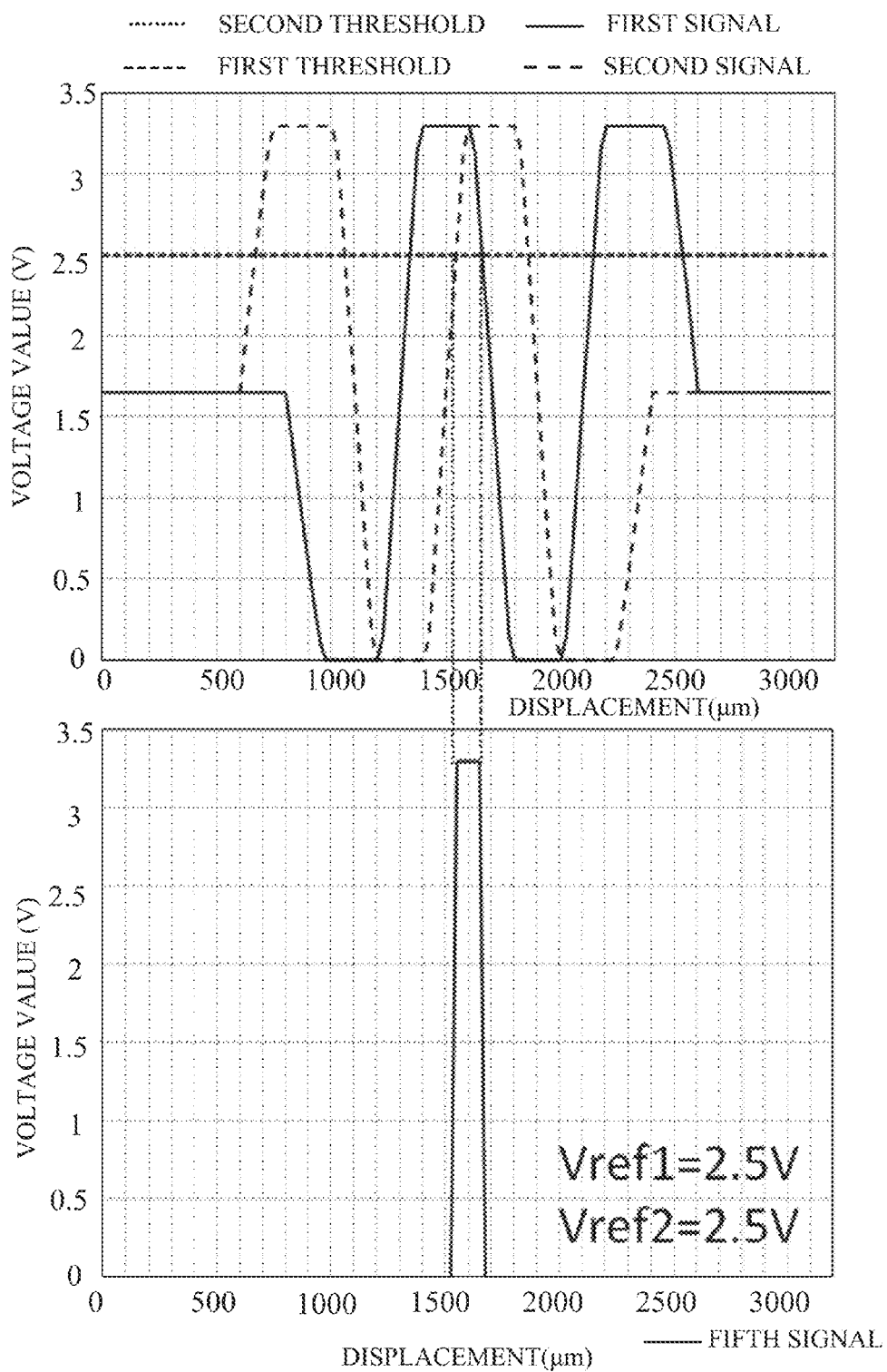
FIG. 19A is a schematic diagram illustrating a first signal, a second signal, and a fifth signal if a first threshold is equal to a second threshold.
Figure 19B:
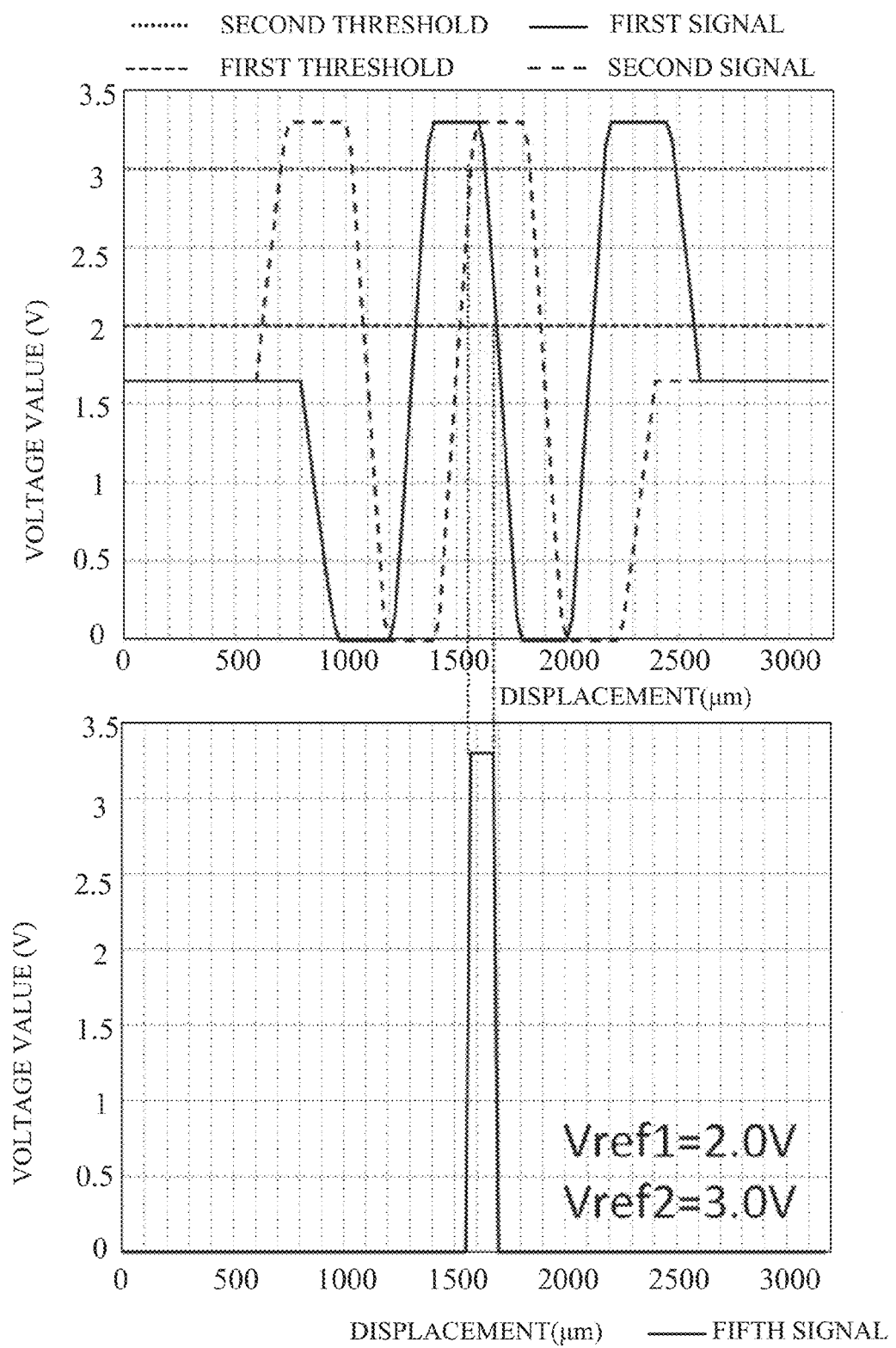
FIG. 19B is a schematic diagram illustrating a first signal, a second signal, and a fifth signal if a first threshold is on a low voltage side and a second threshold is on a high voltage side.
Figure 19C:
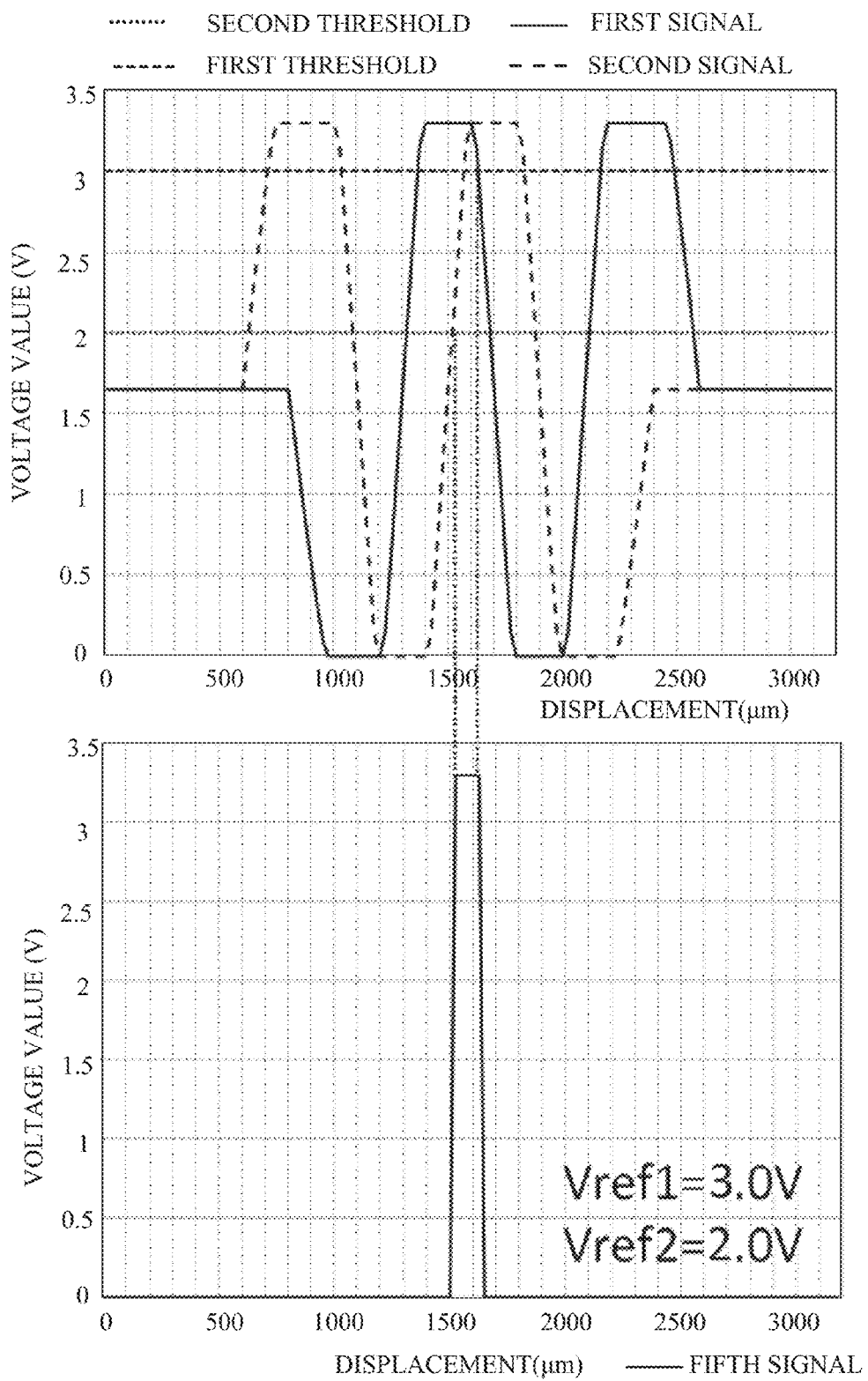
FIG. 19C is a schematic diagram illustrating a first signal, a second signal, and a fifth signal if a first threshold is on a high voltage side and a second threshold is on a low voltage side.

When position of the fifth signal being the origin signal is adjusted in this configuration, the first and second thresholds being respectively thresholds of the first and second signals are individually reversely varied. FIGS. 19A-19C are schematic diagrams illustrating the first, second, and fifth signals if the first and second thresholds are changed from the state that the first threshold is equal to the second threshold. For example, when the origin position moves to the right (from the state of FIG. 19A to the state of FIG. 19B), the first and second thresholds Vref1 and Vref2 are changed to the low voltage side and the high voltage side, respectively. Conversely, when the origin position moves to the left (from the state of FIG. 19A to the state of FIG. 19C), the first and second thresholds are changed to the high voltage side and the low voltage side, respectively. An absolute value of a change of each threshold may be then equivalence. When the absolute values of a change of the thresholds differ from each other, the origin signal width decreases or increases in width compared to the origin signal width of Vref1=Vref2.

When the origin position, where Vref1=Vref2=Vref is satisfied, is an initial position, an adjustment width ΔOrg of the origin position is represented by the following expression (9).

$$\Delta Org = \begin{cases} \pm \dfrac{\lambda}{2} & Vcross - Vref \le Vref - Voffset \\ \pm \dfrac{X - \lambda}{2} & Vcross - Vref > Vref - Voffset \end{cases} \quad (9)$$

Further, in light of a central voltage fluctuation factor Vom and a cross point voltage fluctuation factor vcm, the expression (9) is rewritten to the following expression (10).

$$\Delta Org = \quad (10)$$

$$\begin{cases} \pm \dfrac{\lambda}{2}\left(1 - \dfrac{Vcm}{Vcross - Vref}\right) & Vcross - Vref < Vref - Voffset \\ \pm \dfrac{\lambda}{2}\left(1 - \dfrac{\frac{Vcm}{Vcross - Vref}}{\frac{Vom}{Vref - Voffset}}\right) & Vcross - Vref = Vref - Voffset \\ \pm \dfrac{X - \lambda}{2}\left(1 - \dfrac{Vcm}{Vfref - Voffset}\right) & Vcross - Vref > Vref - Voffset \end{cases}$$

From the above configuration, since the output position of the origin signal is adjustable even if the multiplier 60 is connected, the origin detecting processing of the invention is applied to the system outputting the origin pulse using the origin signal synchronized to the displacement detecting signal. The invention according to this embodiment is also applied to the system where the signal detecting configuration and the processing configuration are separately provided as Embodiment 1.

Embodiment 3

An encoder of this embodiment includes a scale 10, a displacement detecting sensor 20, an origin detecting sensor 30, a displacement detecting signal processor 40 and an origin signal processor 50 as Embodiment 1. However, a pattern of the scale 10 in this embodiment is different from a pattern of the scale 10 in Embodiment 1, and is a single track where a displacement detecting pattern and an origin detecting pattern are combined. In this embodiment, a rotary type configuration detecting a rotational angle of the scale is explained.

Figure 20:
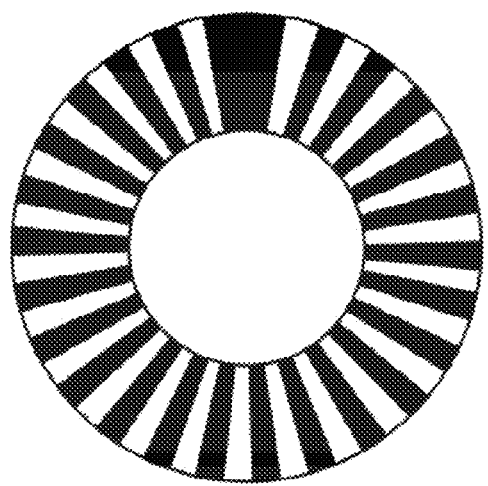
FIG. 20 is a schematic diagram illustrating a rotary scale of Embodiment 3.

FIG. 20 is a schematic diagram illustrating a rotary type single track scale in this embodiment. A pattern periodically arranged over the entire scale is the displacement detecting pattern, and a pattern connected with the displacement detecting pattern on the upper part of the scale is an origin detecting pattern. Both displacement detecting sensor 20 and the origin detecting sensor 30 receive a combined light signal combined reflected light from the displacement detecting pattern and the origin detecting pattern, which are arranged on the same track. In this embodiment, unlike Embodiment 1, it is essential that a resolution of the displacement detecting sensor 20 different from a resolution of the origin detecting sensor 30, in other words, an arrangement of a light receiving element array group is different. Resolution is a scale pitch where the displacement detecting sensor 20 and the origin detecting sensor 30 respond most strongly.

Since the displacement detecting sensor 20 and the origin detecting sensor 30 respectively include light receiving element array groups having different arrangements, they have different spatial frequency response. For example, the displacement detecting sensor 20 most strongly responds a light signal having 400 µm of pitches on the light receiving part 23. Since light intensities relative to a light signal of other pitches output from the light receiving elements A, C are the same, they cancel each other when taking a difference between the light receiving elements A, C. Similarly, since light intensities relative to a light signal of other pitches output from the light receiving elements B, D are the same, they cancel each other when taking a difference between them. In other words, a response of a light signal of other pitches weakens.

Figure 21:
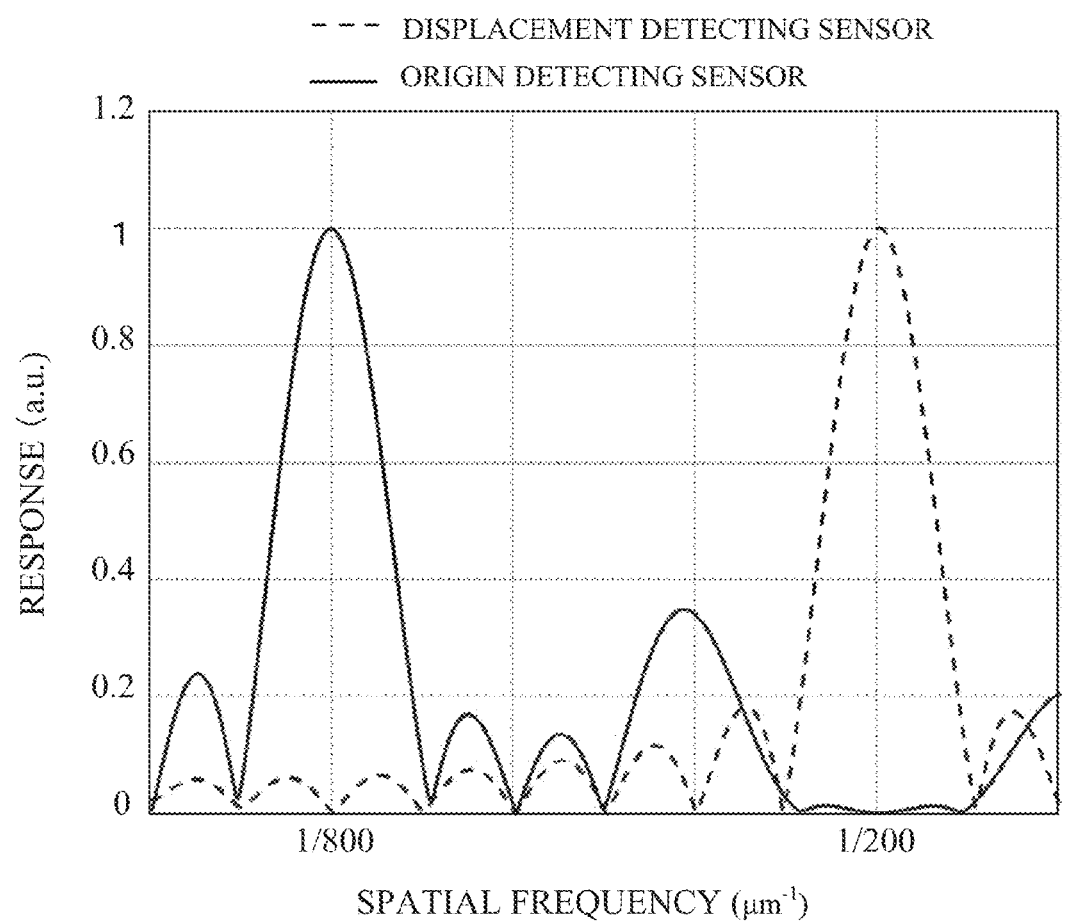
FIG. 21 is a schematic diagram illustrating a resolution and a spatial frequency response.

Spatial frequency responses of the displacement detecting sensor 20 and the origin detecting sensor 30 are illustrated in FIG. 21. In FIG. 21, the abscissa axis denotes a spatial frequency, and the ordinate axis denotes a standardized response of an output of each sensor. As illustrated in FIG. 21, in a light signal where the light from the pattern for displacement detection and the light from the pattern for origin detection are combined, the origin detecting sensor 30 only responds to the light signal from the pattern for origin detection in a light without responding to the light signal from the pattern for displacement detection. In contrast to the origin detecting sensor 30, the displacement detecting sensor 20 only responds to the light signal from the pattern for displacement detection without responding to the light signal from the pattern for origin detection.

A combined light signal from the pattern for displacement detection and the pattern for origin detection, which are arranged in the same track, is divided by the displacement detecting sensor 20 and the origin detecting sensor 30, whose spatial response frequencies are different from each other, and the displacement detecting sensor 20 and the origin detecting sensor 30 response to each light signal.

In this embodiment, a first threshold and a second threshold are set so as to determine whether the first and second signals respectively become signal value on an origin as Embodiment 1.

Figure 22:
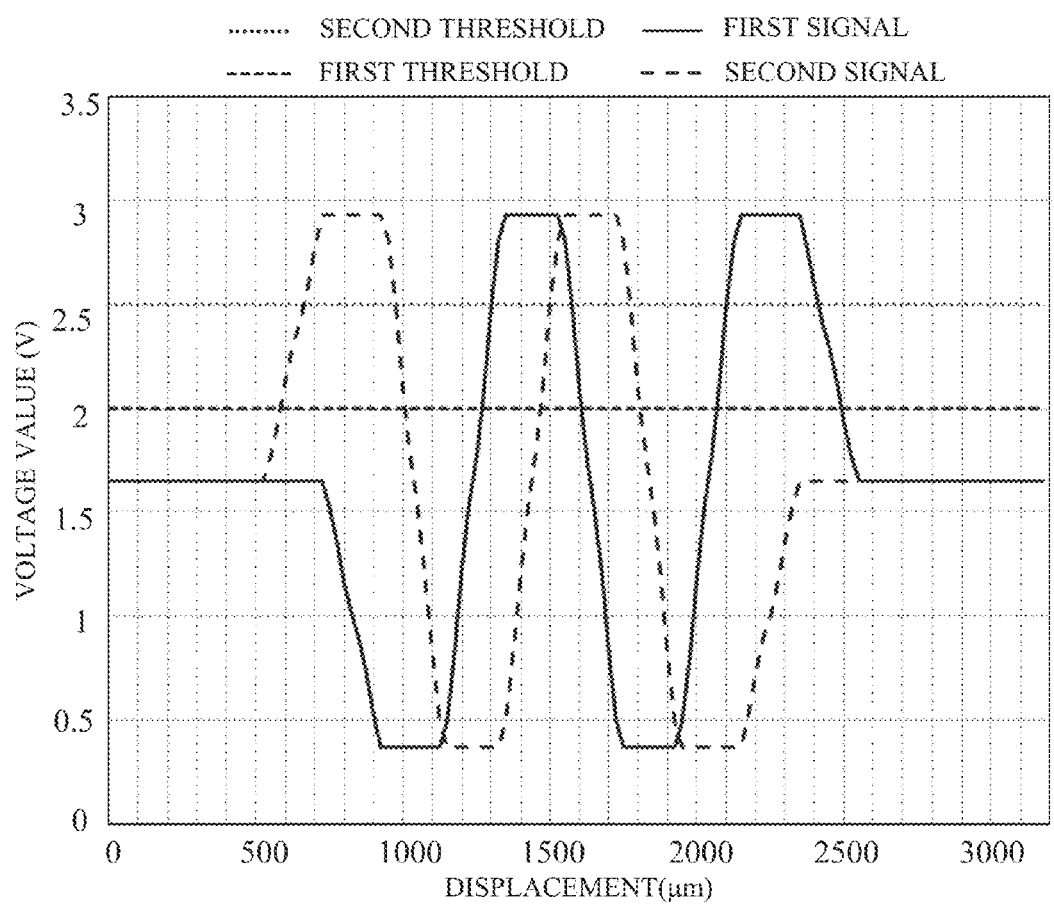
FIG. 22 is a schematic diagram illustrating a first signal, a second signal, a first threshold, and a second threshold of Embodiment 3.

FIG. 22 is a schematic diagram illustrating a first signal and a second signal of the origin detecting sensor 30, a first threshold, and a second threshold. In FIG. 22, the abscissa axis denotes a displacement, and the ordinate axis denotes a voltage value. The amplitude changes according to light quantity and a positional relation between a sensor and a scale, but the amplitude in this embodiment varies between 0.5-3.0V. In this embodiment, the origin detecting sensor 30 receives a light signal combined the reflected light from the pattern for displacement detection and the reflected light from the pattern for origin detection. However, as illustrated in FIG. 22, the reflected light from the pattern for displacement detection is not almost responded by a spatial frequency response characteristic of the origin detecting sensor 30, and components of the reflected light from the pattern from origin detection are especially output.

In the configuration where each pattern for detection is arranged on different tracks, when each sensor is displaced in a direction perpendicular to a detecting direction relative to the scale, each sensor departs from a range of each pattern for detection on the basis of a track boundary, and as a result, each sensor cannot be read. Meanwhile, in the configuration where each pattern for detection is arranged on the same track, since the track boundary does not exist, each sensor does not mistake each pattern for detection when each sensor is displaced in a direction perpendicular to a detecting direction relative to a scale. A variation in a radial direction of each sensor of the configuration where the pattern for origin detection and the pattern for displacement detection are arranged on the same track strengthen that of the configuration where they are arranged on different tracks. In the rotary type scale, since a direction perpendicular to a detecting direction is an eccentric direction of the scale, the rotary scale strengthens a variation in a radial direction.

An origin signal is acquired by using a signal from the origin detecting sensor 30 and performing the same process as Embodiment 1. The invention according to this embodiment is also applied to the system where the configuration of the signal detector is different from the configuration of the processor as Embodiment 1.

Embodiment 4

Figure 23:
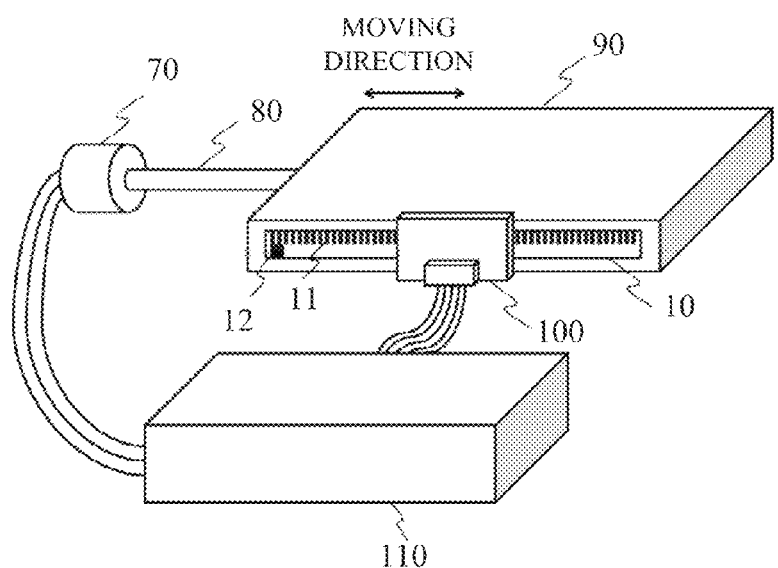
FIG. 23 is a schematic diagram illustrating a linear stage of Embodiment 4.

FIG. 23 is a schematic diagram illustrating a linear stage according to this embodiment. The linear stage includes a scale 10, a motor 70, a ball screw 80, a stage 90, an encoder 100, and a controller 110. The encoder 100 includes the displacement detecting sensor 20, the origin detecting sensor 30, the displacement detecting signal processor 40, and the origin signal processor 50 of Embodiment 1. Additionally, the encoder 100 is a reflective type optical encoder as other embodiments.

The ball screw 80 is capable of converting a rotating motion of the motor 70 into a linear motion, and the stage 90 moves in a moving direction of FIG. 23 according to rotating amounts of the motor 70 by the ball screw 80. The scale 10 is attached to a side surface of the stage 90 so as to detect along a uniaxial moving direction, and the encoder 100 is mounted so as to read the scale 10. The controller 110 detects displacement of the stage 90 based on a signal from the encoder 100, and controls a position of the stage 90 by controlling rotating amounts of the motor 70.

Displacement detection is performed by the displacement detecting sensor 20 of the encoder 100 and the pattern for displacement detection of the track 11 of the scale 10. The displacement detecting sensor 20 outputs two phase sinusoidal signals according to relative displacement from the scale 10, and the encoder 100 converts it into a position signal so as to transmit to the controller 110.

In this configuration, the controller 110 needs to receive displacement from a standard position of the stage 90. This is for avoiding a false operation that the controller 110 continues to rotate the motor 70 by mistaking reaching of the stage 90 to the limit position in the uniaxial moving direction. A limit sensor may be used so as to receive the limit position in the uniaxial moving direction, but is not used in this embodiment because components increase by providing the limit sensor in addition to the encoder 100. The components are the encoder 100 and peripheral circuit components of the limit sensor.

In this embodiment, a pattern for origin detection of the track 12 as a reference of an absolute position is prepared in the scale 10 apart from the pattern for displacement detection of the track 11, and is detected by the origin detecting sensor 30 of the encoder 100.

In this embodiment, when power is supplied, origin detection for searching an origin pattern is performed by moving the stage 90 so as to detect an origin. When the pattern for origin detection reaches on the origin detecting sensor 30 of the encoder 100, the fifth signal as the origin signal is transmitted to the controller 110 through the origin signal processor 50. The controller 110 recognizes that the stage 90 is positioned at the origin by receiving the origin signal, and then resets the detecting position to 0. After then, displacement detection regarded a region where the pattern for origin detection exists as the origin position is performable, and thus the stage 90 is capable of being accurately controlled.

Embodiment 5

Figure 24:
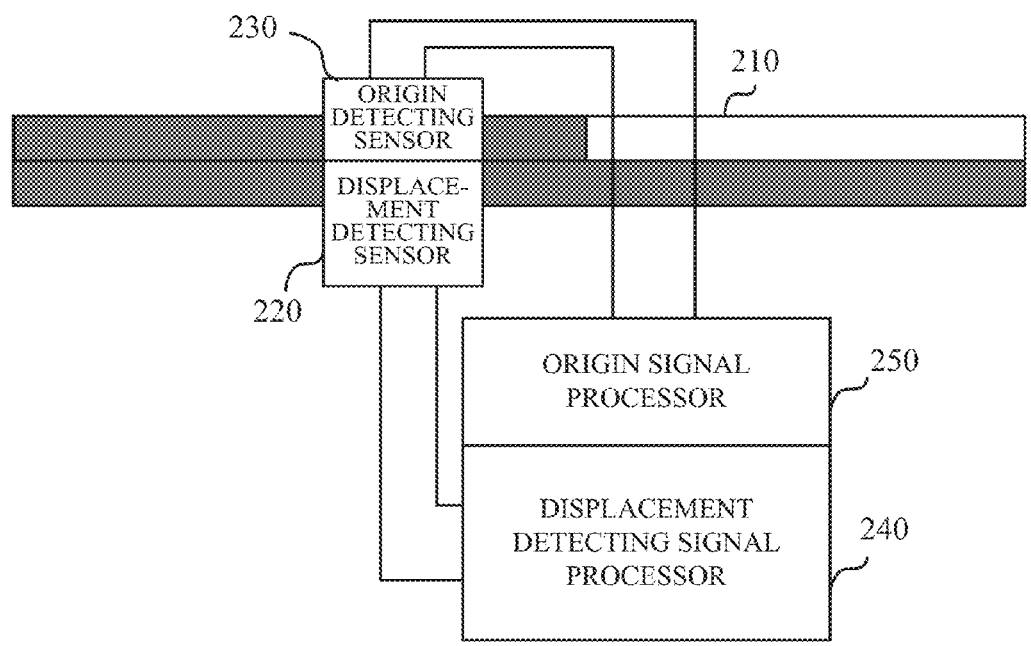
FIG. 24 is a schematic diagram illustrating a configuration of an encoder in Embodiment 5.

In this embodiment, a linear type encoder detecting moving amounts in a uniaxial direction is explained as example. FIG. 24 is a schematic diagram illustrating a configuration of an encoder in this embodiment. The encoder includes a scale 210, a displacement detecting sensor (displacement detector) 220, an origin detecting sensor (origin detector) 230, a displacement detecting signal processor 240, and an origin signal processor 250. The encoder of this embodiment is a reflective type optical incremental encoder detecting relative displacement between the scale 210, and the displacement detecting sensor 220 or the origin detecting sensor 230. The scale 210 is attached along a uniaxial moving direction of a measured object, and further the displacement detecting sensor 220 is attached to a fixing member so as to detect displacement of the measured object. When the scale 210 is positioned at an origin position, an origin signal from the origin detecting sensor 230 is sent to the displacement detecting signal processor 240 as a digital pulse.

Figure 25:
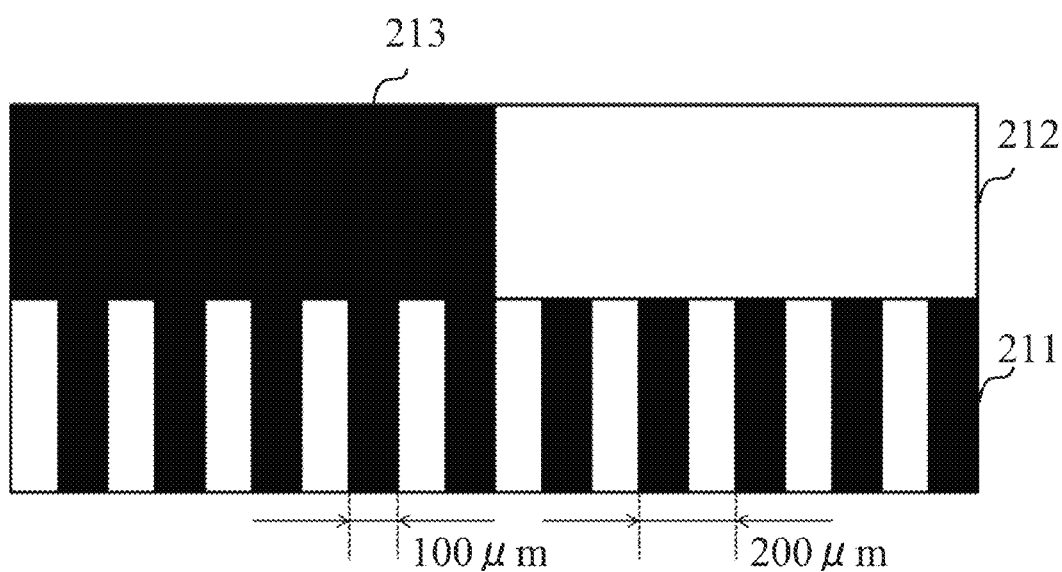
FIG. 25 is a schematic diagram illustrating tracks of a scale.

The scale 210 includes two tracks 211, 212 as illustrated in FIG. 25. The track 211 is used for displacement detection, and the track 212 is used for origin detection. In each track, a black part is a reflecting part, and a white part is a non-reflecting part. A period of the track 211 is 200 μm, and a reflecting part and a non-reflecting part thereof are alternately arranged at every 100 μm. A reflecting part 213 is continuously formed from a center of the track 212 to an end of the scale 210.

Figure 26:
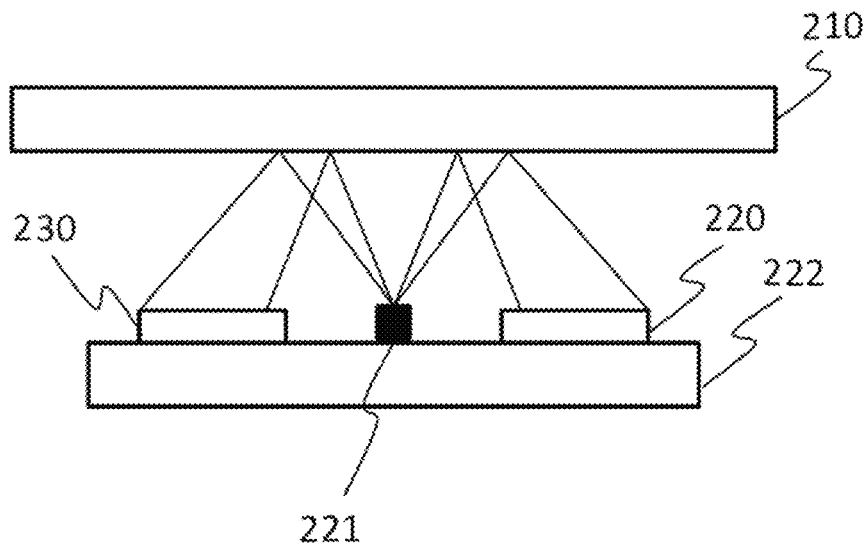
FIG. 26 is a schematic diagram illustrating an optical system.

The displacement detecting sensor 220, the origin detecting sensor 230, and a light source 221 are mounted on a mounting substrate 222 as illustrated in FIG. 26. Since an optical system is the same as Embodiment 1, detailed explanation is omitted.

Additionally, since displacement detection is performed by the same method as Embodiment 1, detailed explanation is omitted.

Figure 27:
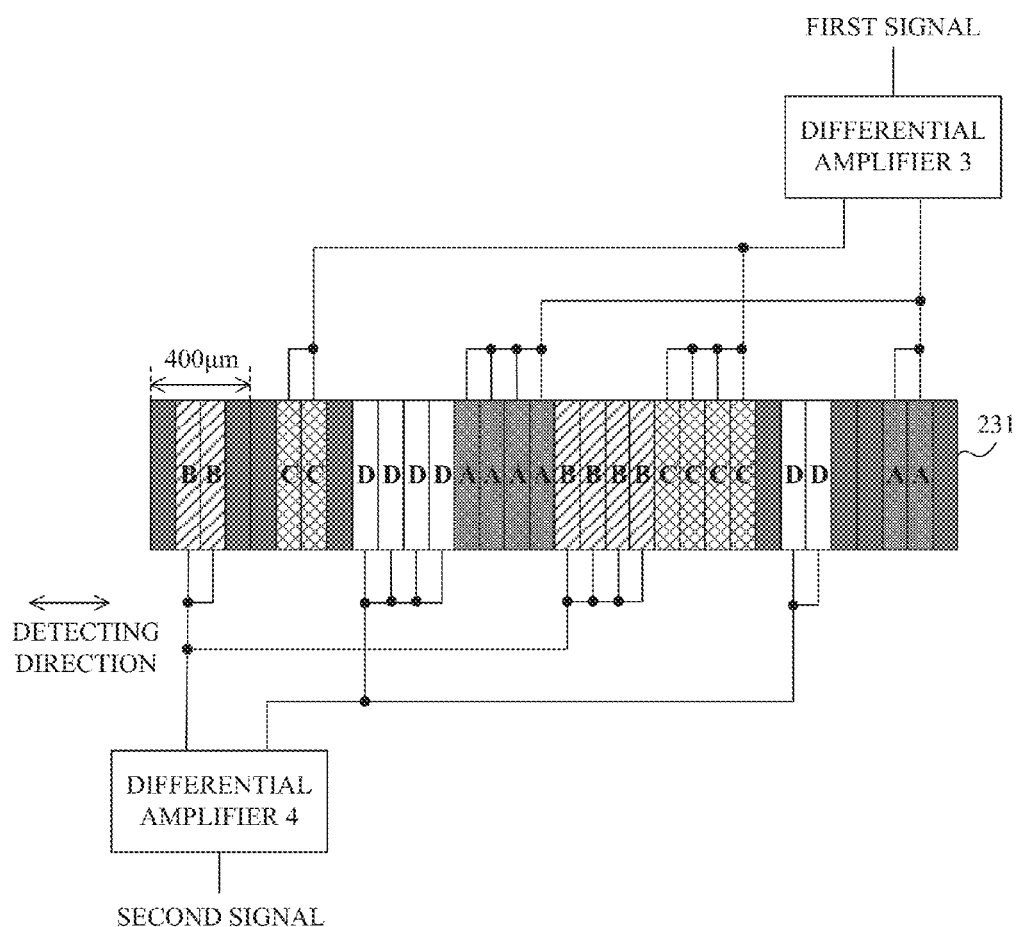
FIG. 27 is a schematic diagram illustrating detecting blocks of an origin detecting sensor.

Next, origin detection in this embodiment is explained. The origin detection sensor 230 includes detection blocks as illustrated in FIG. 27. In FIG. 27, light receiving elements (detector) A-D output voltages proportional to light receiving quantity. The light receiving element B, the light receiving element C, the light receiving element D, and the light receiving element A are arranged in order from an end, and two periods of this light receiving element array group (detecting element group) are arranged on a light receiving part 231. Each length of the light receiving elements A-D in a detecting direction is 400 μm, and a length of the light receiving part 231 in the detection direction is 3200 μm. The light receiving elements A-D are arranged on the light receiving part 231 so that light receiving sensitivity (signal sensitivity) of a peripheral part becomes a half compared with light receiving sensitivity (signal sensitivity) of a central part. Here, the peripheral part means positions where the light receiving elements arranged at a left side and a right side, in other words, two light receiving elements B and two light receiving elements C arranged at a left side, and two light receiving elements A and two light receiving elements D arranged at a right side exist in FIG. 27. The central part means positions where the light receiving elements arranged at a center, in other words, four light receiving elements D, four light receiving elements A, four light receiving elements B, and four light receiving elements C arranged on both sides from a center of the light receiving part 231 exist by a half period. Concretely, when focusing on the light receiving element A, four light receiving elements A are arranged at the center part and two light receiving elements A are arranged on right side. Since an output voltage value of the light receiving element is proportional to an arrangement number of the light receiving elements, light receiving sensitivity (signal sensitivity) of the light receiving elements A arranged on the right side becomes a half compared with light receiving sensitivity (signal sensitivity) of the light receiving elements A arranged at the center. The same applies to other light receiving elements.

A differential amplifier 3 takes a difference between voltages output from the light receiving elements A, C on the basis of the central voltage, and a differential amplifier 4 takes a difference between voltages output from the light receiving elements B, D on the basis of the central voltage. An output of the differential amplifier 3 is a first signal, and an output of the differential amplifier 4 is a second signal.

When the length in the detecting direction of the light receiving part 231 of the origin detecting sensor 230 is x, a phase difference between the first and second signals is x/8 on the light receiving part 231, which corresponds to x/16 on the scale, from the arrangement of FIG. 27. This represents that the phase difference between the generated first and second signals is 400 μm on the light receiving part 231, in other words, 200 μm on the scale.

A first threshold and a second threshold are prepared as a reference signal so as to detect an origin position from the first and second signals. These are used so as to determine whether or not the first and second signals respectively become signals on an origin.

Figure 28:
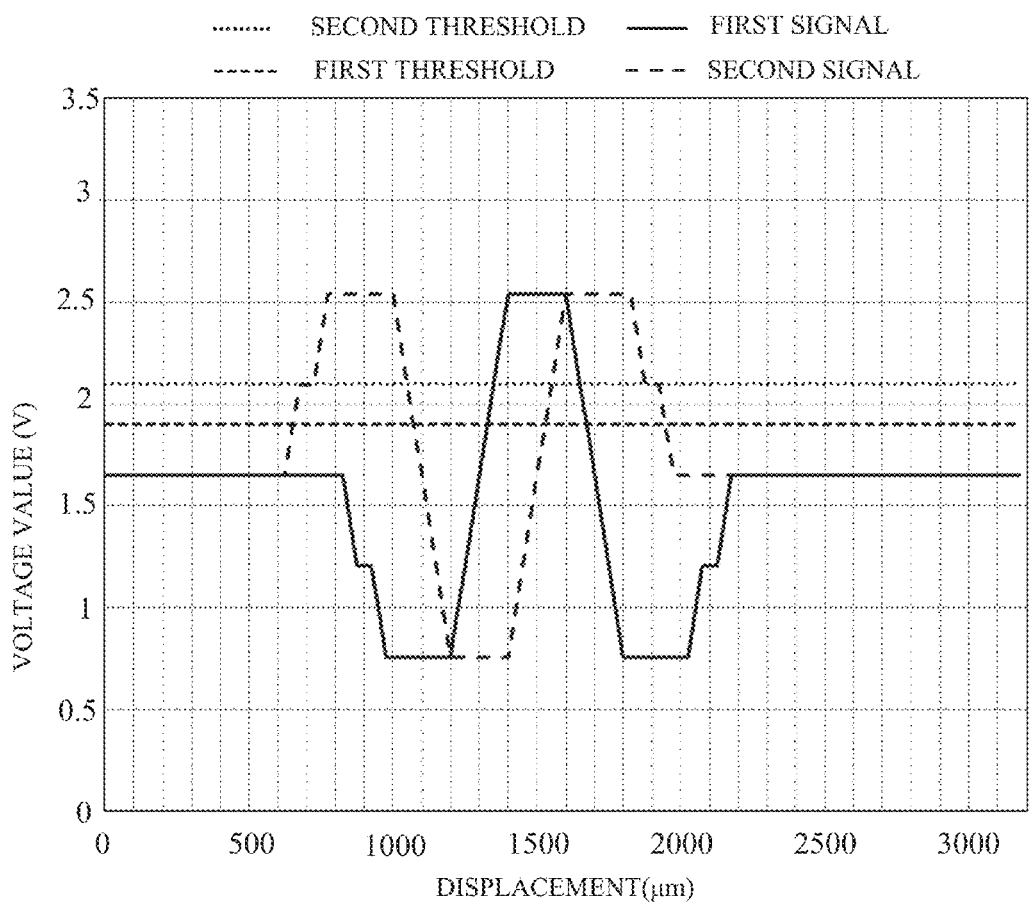
FIG. 28 is a schematic diagram illustrating a first signal, a second signal, a first threshold, and a second threshold of Embodiment 5.

In this configuration, FIG. 28 is a schematic diagram illustrating the first and second signals and the first and second thresholds when the origin detecting sensor 230 reads a scale where an origin pattern following from a central part to an end in a detecting direction is formed. In FIG. 28, the abscissa axis denotes displacement, and the ordinate axis denotes a voltage value. A power supply of the origin detecting sensor 230 is 3.3V similar to the displacement detecting sensor 220. Additionally, the central voltage becomes 1.65V being ½Vcc because the differential amplifiers 3, 4 take a differential based on the central voltage relative to the power supply. The first and second signals swing between the low and high voltage sides on the basis of the central voltage. The amplitude changes according to light quantity and a positional relation between a sensor and a scale, and swings between 0.7-2.5V in this embodiment.

Since the origin detecting sensor 230 includes two light receiving element array groups comprising the light receiving elements A-D as illustrated in FIG. 27, two periods of first and second signals being a response output to the reflecting part 213 of the origin detecting sensor 230 are output. In a detecting direction, the light receiving elements A, B connected with non-inverting input terminals of the differential amplifiers 3, 4, and the light receiving elements C, D connected with inverting input terminals of the differential amplifiers 3, 4 are symmetrically arranged relative to a center of the light receiving element array group, respectively. Additionally, the light receiving elements A, B are arranged outside of the light receiving element array group, and the light receiving elements C, D are arranged inside thereof. The light receiving elements of the light receiving element array group is arranged in order of the light receiving elements B, C, D, A in this embodiment, but the arrangement of the light receiving elements is not limited. The light receiving elements A, B may be adjacent to each other or be arranged at both ends of the light receiving element array group, or the light receiving elements C, D may be adjacent to each other or be arranged at both sides. In other words, a differential between the first signal acquired by processing output signals of the light receiving elements A, C and the second signal acquired by processing output signals of the light receiving elements B, D may be ¼ of a length in a displacement detecting direction of the light receiving element array group.

Figure 29:
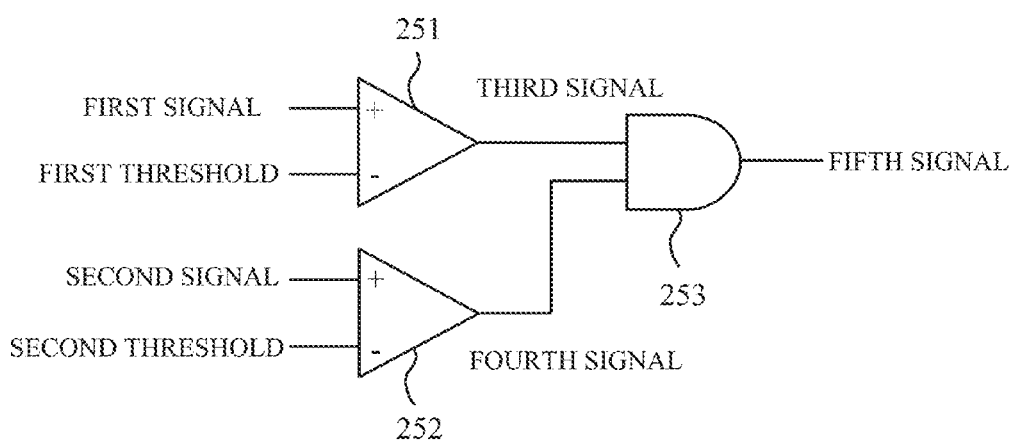
FIG. 29 is a schematic diagram illustrating a processing part of an origin detecting processor.
Figure 30:
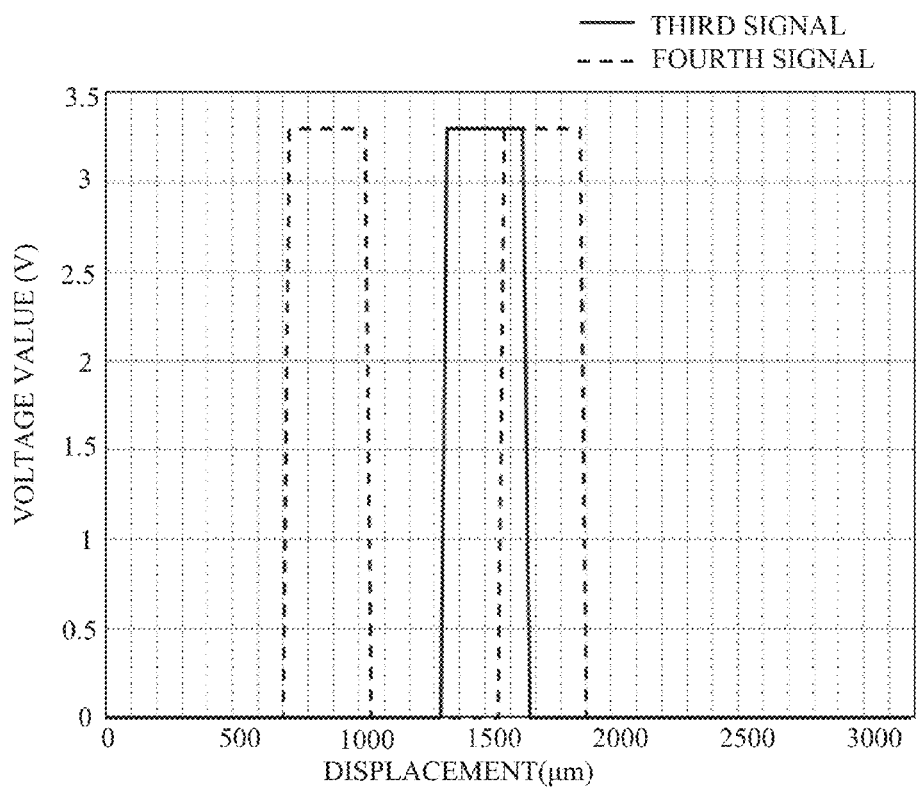
FIG. 30 is a schematic diagram illustrating a third signal, and a fourth signal.
Figure 31:
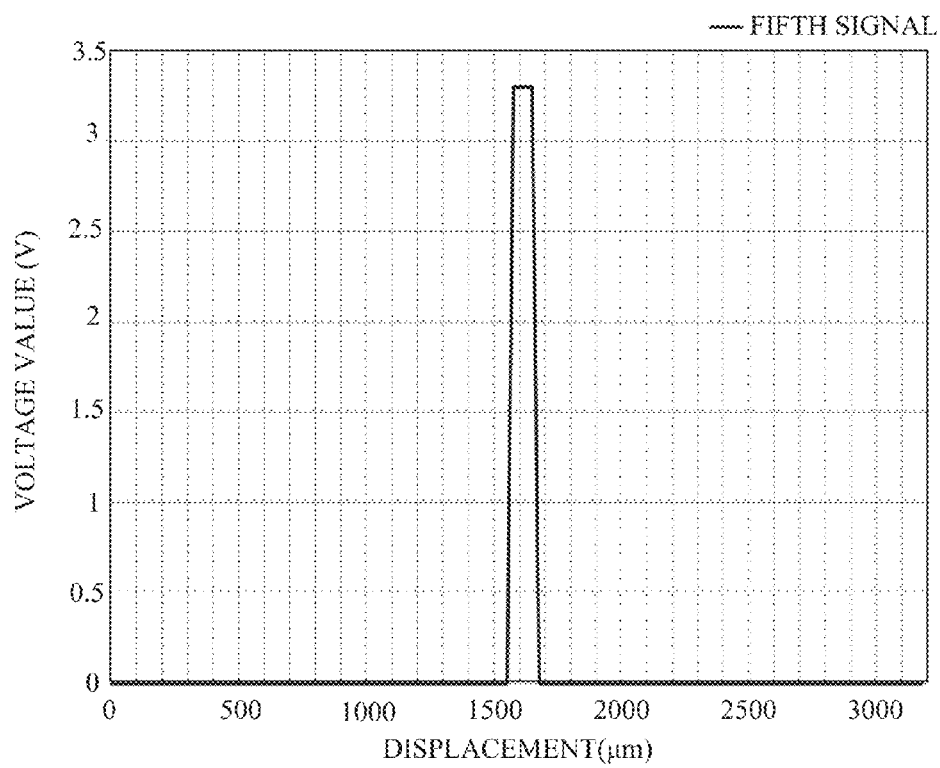
FIG. 31 is a schematic diagram illustrating a fifth signal.

The origin signal processor 250 includes a processing part as illustrated in FIG. 29. A comparator 251 outputs a third signal by comparing the first signal and the first threshold, and a comparator 252 outputs a fourth signal by comparing the second signal and the second threshold. The comparator 251 outputs a high-level signal if the first signal is higher than the first threshold, otherwise outputs a low-level signal. The comparator 252 also outputs a high-level signal if the second signal is higher than the second threshold, otherwise outputs a low-level signal. FIG. 30 is a schematic diagram illustrating the third and fourth signals. Since two periods of each signal are output, an output from each comparator is two periods of a binarized output. An AND circuit 253 calculates the logical product of the third and fourth signals and outputs a fifth signal. Since both the first and second signals become high-level signals when the reflected light from the reflecting part 213 is incident to the center part of the light receiving part 231, the fifth signal being one pulse of an origin signal as illustrated in FIG. 31 is generated by being calculated the logical product by the AND circuit 253. In this embodiment, when the fifth signal becomes high-level signal, the displacement detecting signal processor 240 determines that a measured object is positioned at an origin position and then resets a count value at every period to 0. In this embodiment, the origin signal processor 250 is comprised of the comparators 251, 252 and the AND circuit 253, but may be comprised of any configuration if a signal similar to the fifth signal can be acquired.

Figure 32:
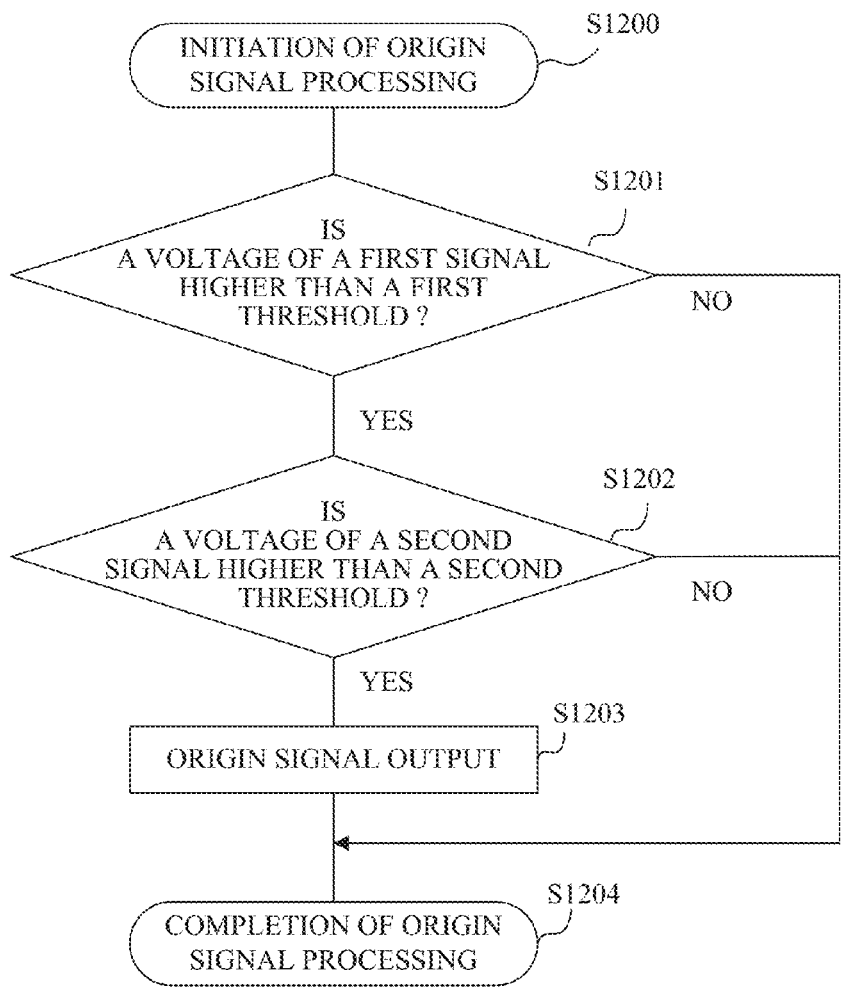
FIG. 32 is a flowchart of an origin signal processing.

Regarding the above process, a specific example is explained using a flowchart of FIG. 32. After initiating an origin signal processing in a step S1200, whether a voltage of the first signal is higher than the first threshold is determined (step S1201). If the voltage of the first signal is higher than the first threshold, the process proceeds to next determination, otherwise finishes (step S1204). In a step S1202, whether a voltage of the second signal is higher than a second threshold is determined. If the voltage of the second signal is higher than the second threshold, an origin signal is output (step S1203). In this embodiment, the determination about the voltage of the second signal and the second threshold is determined after the determination about the voltage of the first signal and the first threshold is determined, but these determinations may be in reverse order. Additionally, satisfying both determinations may be determined after determining these determinations at the same time.

As previously mentioned, the fifth signal is activated when both the first and second signals have higher voltages than the central voltage. The first and second thresholds may be thus set as the following expressions (11), (12), respectively. Voffset1, Voffset2 are the central voltages of the first and second signals, respectively, and Vref1, Vref2 are the first and second thresholds, respectively.

Additionally, Vcross is a voltage, where the first and second signals intersect, higher than the central voltage (hereinafter referred to as "cross point voltage").

$$V\text{offset1} < V\text{ref1} < V\text{cross} \quad (11)$$

$$V\text{offset2} < V\text{ref2} < V\text{cross} \quad (12)$$

These expressions represent that the first and second thresholds being reference signals are only determined by the central voltage and the cross point voltage, and is not affected by a signal from the peripheral part. The central voltage and the cross point voltage respectively have fluctuation components such as light quantity fluctuation, origin pattern fluctuation, and amplifier fluctuation. Thus, the expressions (11), (12) can be rewritten as the following expressions (13), (14), respectively. Vom represents a central voltage fluctuation factor, and vcm represents a cross point voltage fluctuation factor.

$$V\text{offset1} + V\text{om} < V\text{ref1} < V\text{cross} - V\text{cm} \quad (13)$$

$$V\text{offset2} + V\text{om} < V\text{ref2} < V\text{cross} - V\text{cm} \quad (14)$$

When the fifth signal becomes high-level signal, the displacement detecting signal processor 240 determines that a measured object is positioned at an origin position and then resets a count value at every period to 0.

Figure 33:
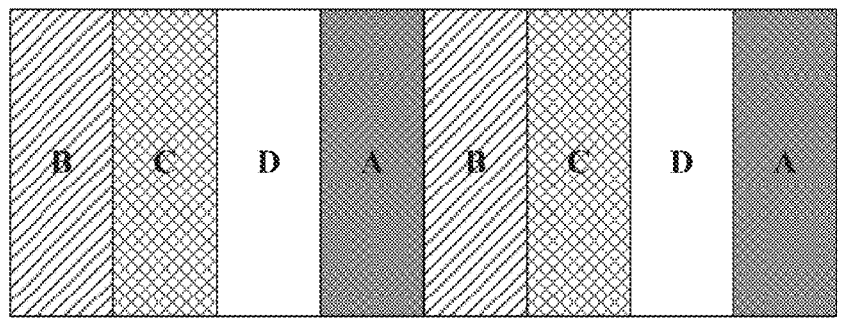
FIG. 33 is a schematic diagram illustrating a light receiving part when a light receiving sensitivity ratio is 1.
Figure 34:
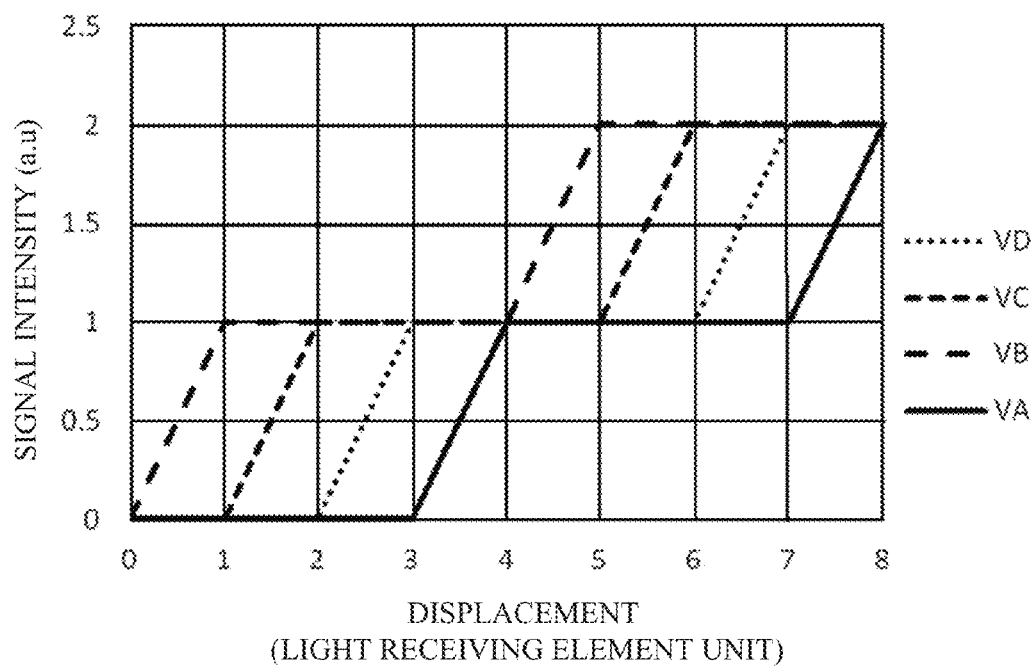
FIG. 34 is a schematic diagram illustrating signal intensity from each light receiving element when a light receiving sensitivity ratio is 1.
Figure 35:
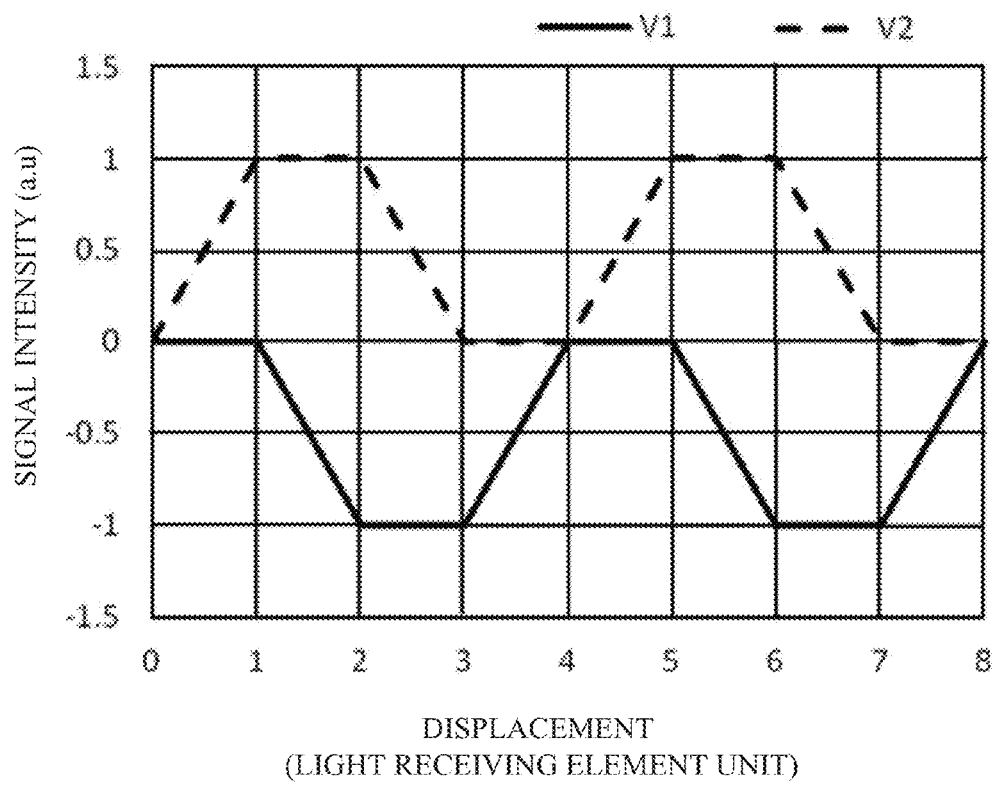
FIG. 35 is a schematic diagram illustrating a signal variation when a difference between signals of FIG. 34 is taken.

Next, an effect that sensitivity φN of the peripheral part of the light receiving part 231 of the origin detecting sensor 230 is a half relative to light receiving sensitivity (signal sensitivity) φM at the center part (i.e., a light receiving sensitivity (signal sensitivity) ratio φN/φM is a half) is explained. FIG. 33 illustrates the light receiving part 231 when the light receiving sensitivity (signal sensitivity) ratio φN/φM is 1. Two periods of a combination arranged in order of the light receiving elements B, C, D, A is formed on the light receiving part 231. When focusing on the light receiving element B, the light receiving element B arranged on left side and the light receiving element B arranged at a center in FIG. 33 have the same light receiving sensitivity (signal sensitivity). Then, the light receiving sensitivity ratio φN/φM is 1. FIG. 34 is a schematic diagram illustrating relations between an output signal intensity and displacement of the light receiving elements A-D when the track 212 is displaced from a state where a reflected light from the reflecting part 213 relative to the light receiving part 231 is not irradiated to a state where the reflected light is irradiated to the entire light receiving part 231. In FIG. 34, the abscissa axis denotes displacement of a light receiving element unit, and the ordinate axis denotes signal intensity. The signal intensity of each light receiving element raises in order of the light receiving element B, the light receiving element C, the light receiving element D, and the light receiving element A according to the arrangement of the light receiving elements as illustrated in FIG. 33 and the light receiving sensitivity (signal sensitivity) ratio. Then, since the light receiving sensitivity (signal sensitivity) of each light receiving element is the same, a lifting ratio of the signal intensity is the same. When the reflected light from the reflecting part 213 reaches to a half of a length of the light receiving part 231, in other words, a point 4 of FIG. 34, all light receiving elements receive the same light quantity and then the output signal intensities of these light receiving elements are the same. The same change based on these signal intensities follows according to displacement of the reflected light from the reflecting part 213. When the reflected light from the reflecting part 213 is irradiated to the entire light receiving part 231, the output signal intensities of these light receiving elements are again the same. FIG. 35 is a schematic diagram illustrating a signal variation when a difference between signal intensities from each light receiving element of FIG. 34 is taken based on an expression (A). In FIG. 35, the abscissa axis denotes displacement of a light receiving element unit, and ordinate axis denotes signal intensity. Additionally, Voffset of the expression (A) is 0 for simplicity. Signal intensity of each light receiving element having the same value at the point 4 of FIG. 34 becomes 0 by taking a difference, and the same offset which signal intensity from each light receiving element after the point 4 has is also removed. A waveform between the point 0 and the point 4 of an output signal after a differential is the same as a waveform between the point 4 and the point 8 of the output signal, and origin detection is not performable because only condition is not acquired from each signal.

Figure 36:
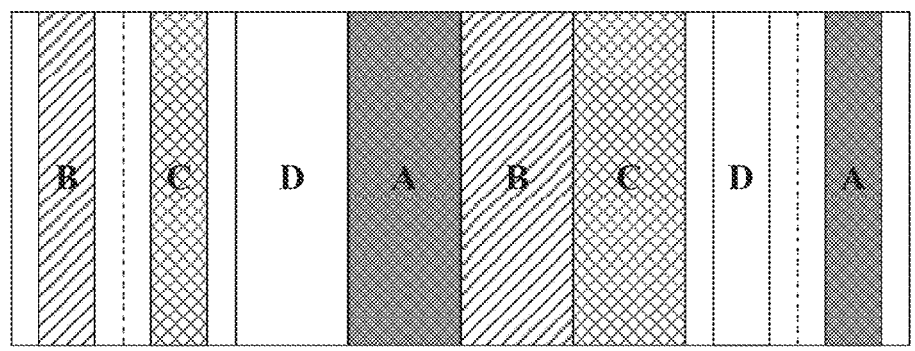
FIG. 36 is a schematic diagram illustrating a light receiving part when a light receiving sensitivity ratio is 0.5.
Figure 37:
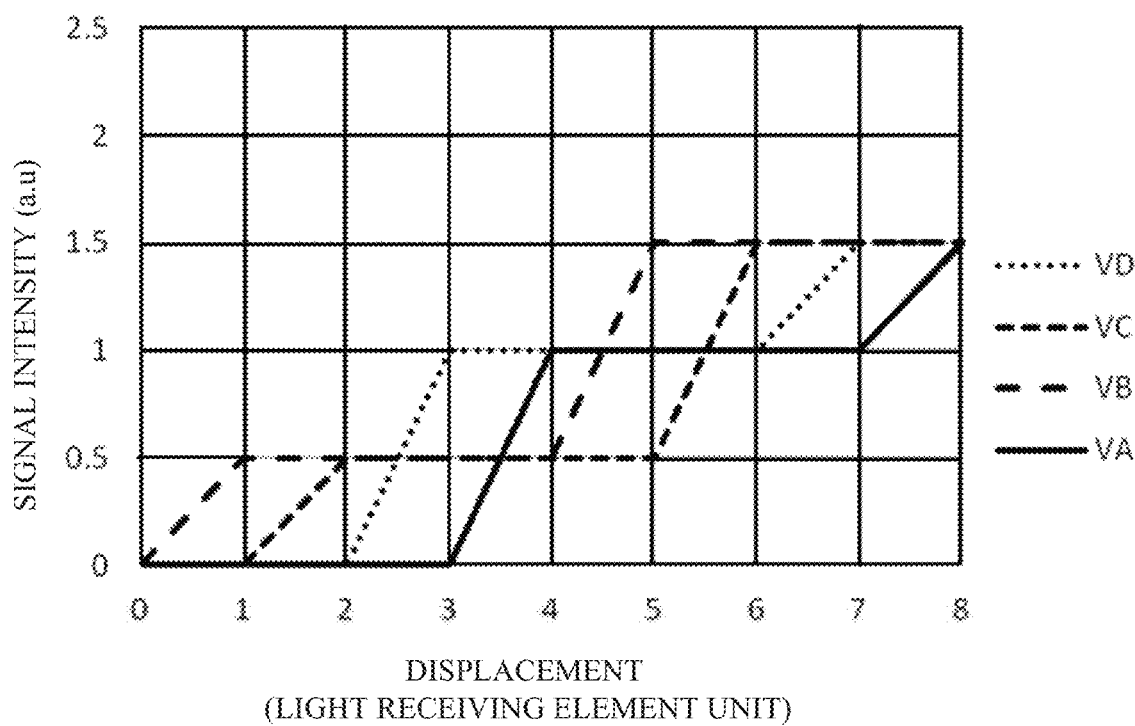
FIG. 37 is a schematic diagram illustrating signal intensity from each light receiving element when a light receiving sensitivity ratio is 0.5.
Figure 38:
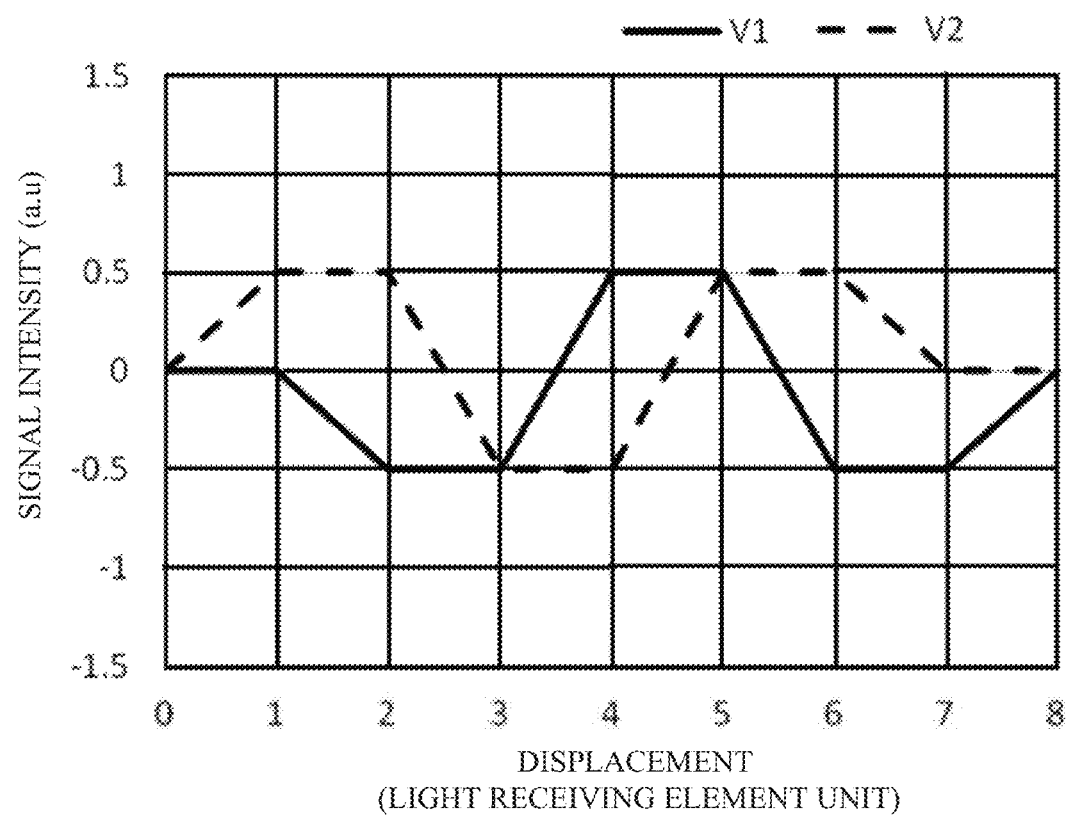
FIG. 38 is a schematic diagram illustrating a signal variation when a difference between signals in FIG. 37 is taken.
Figure 39A:
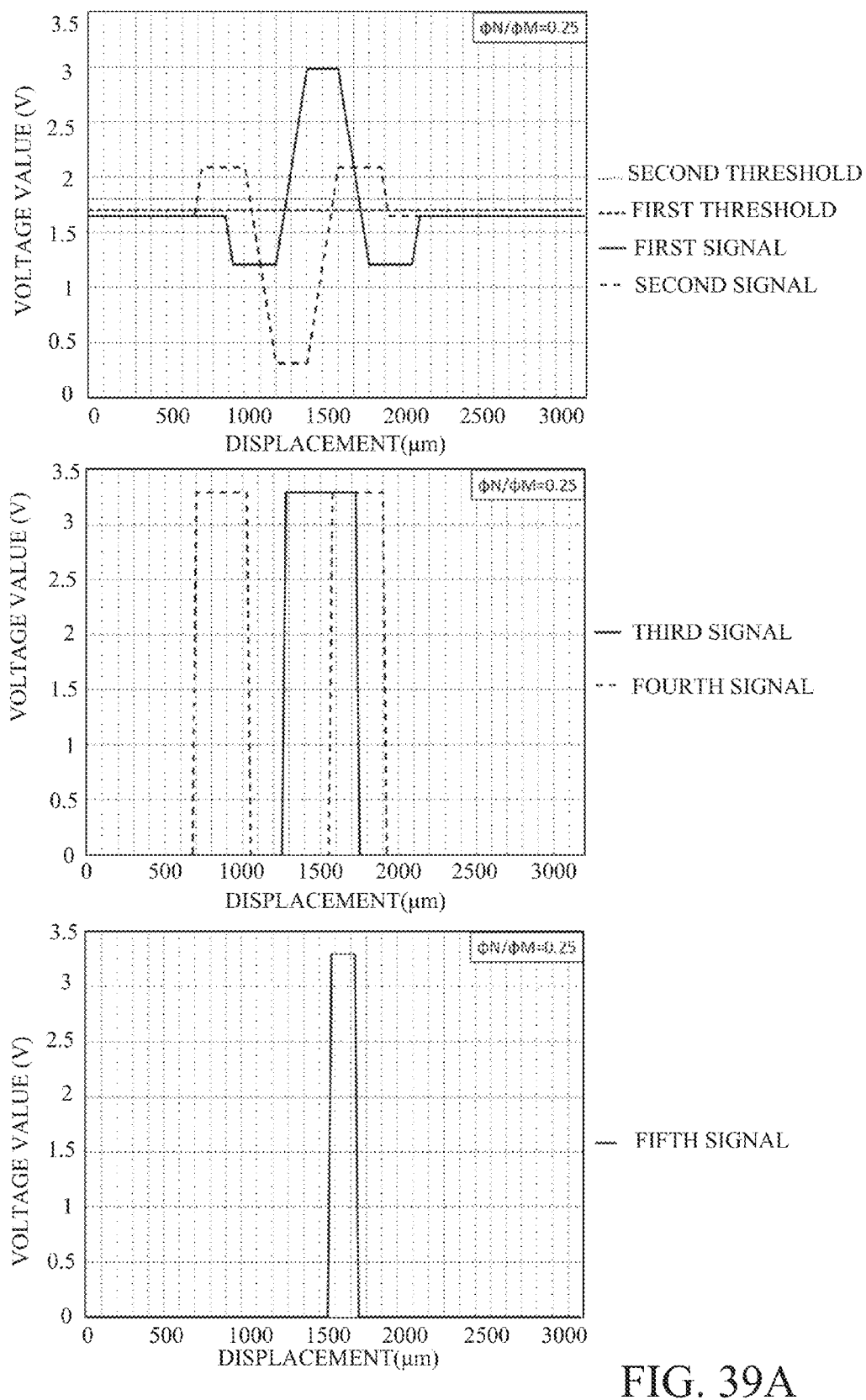
FIG. 39A is a schematic diagram illustrating a first to a fifth signals when a light receiving sensitivity ratio is 0.25.
Figure 39B:
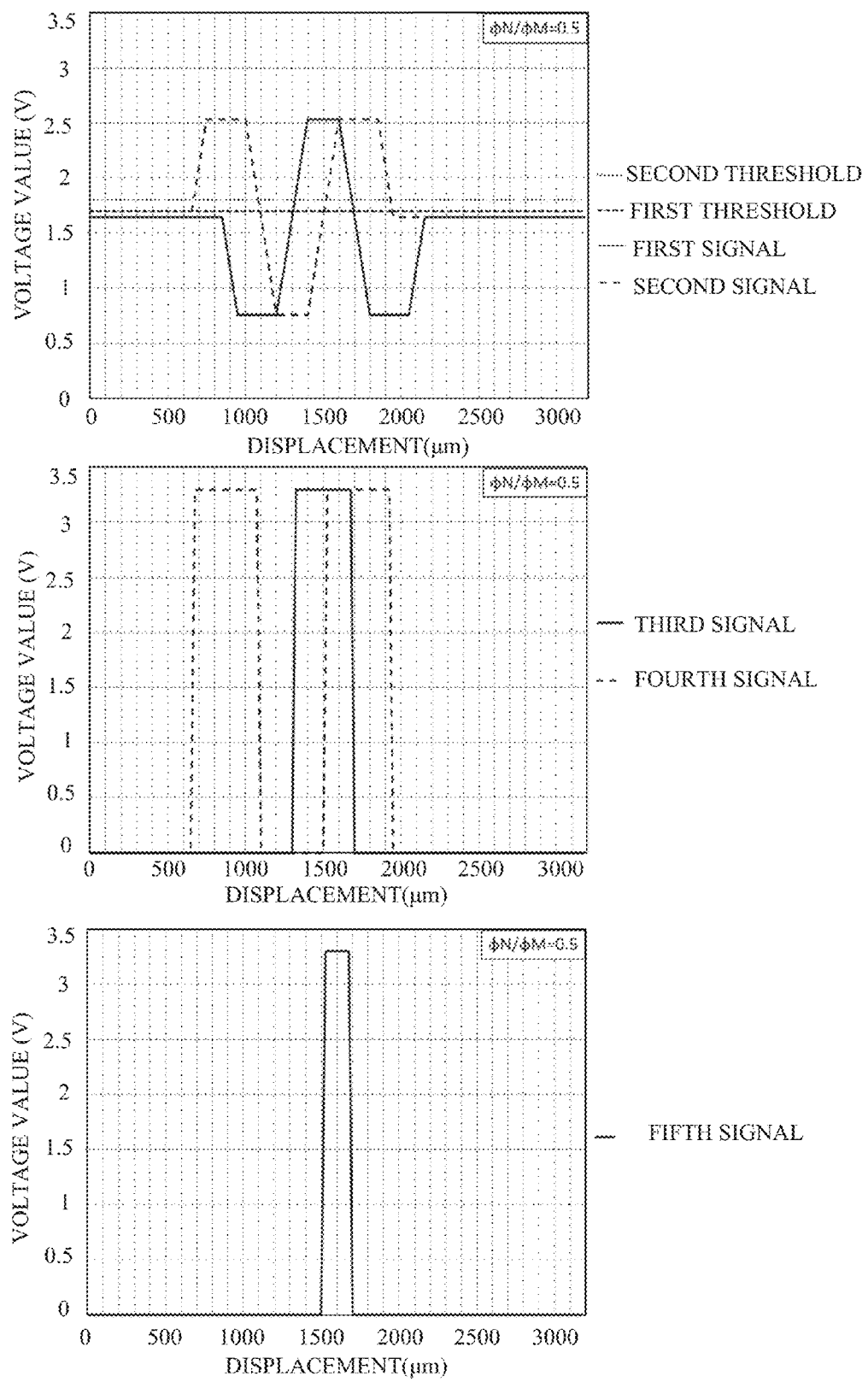
FIG. 39B is a schematic diagram illustrating a first to a fifth signals when a light receiving sensitivity ratio is 0.5.
Figure 39C:
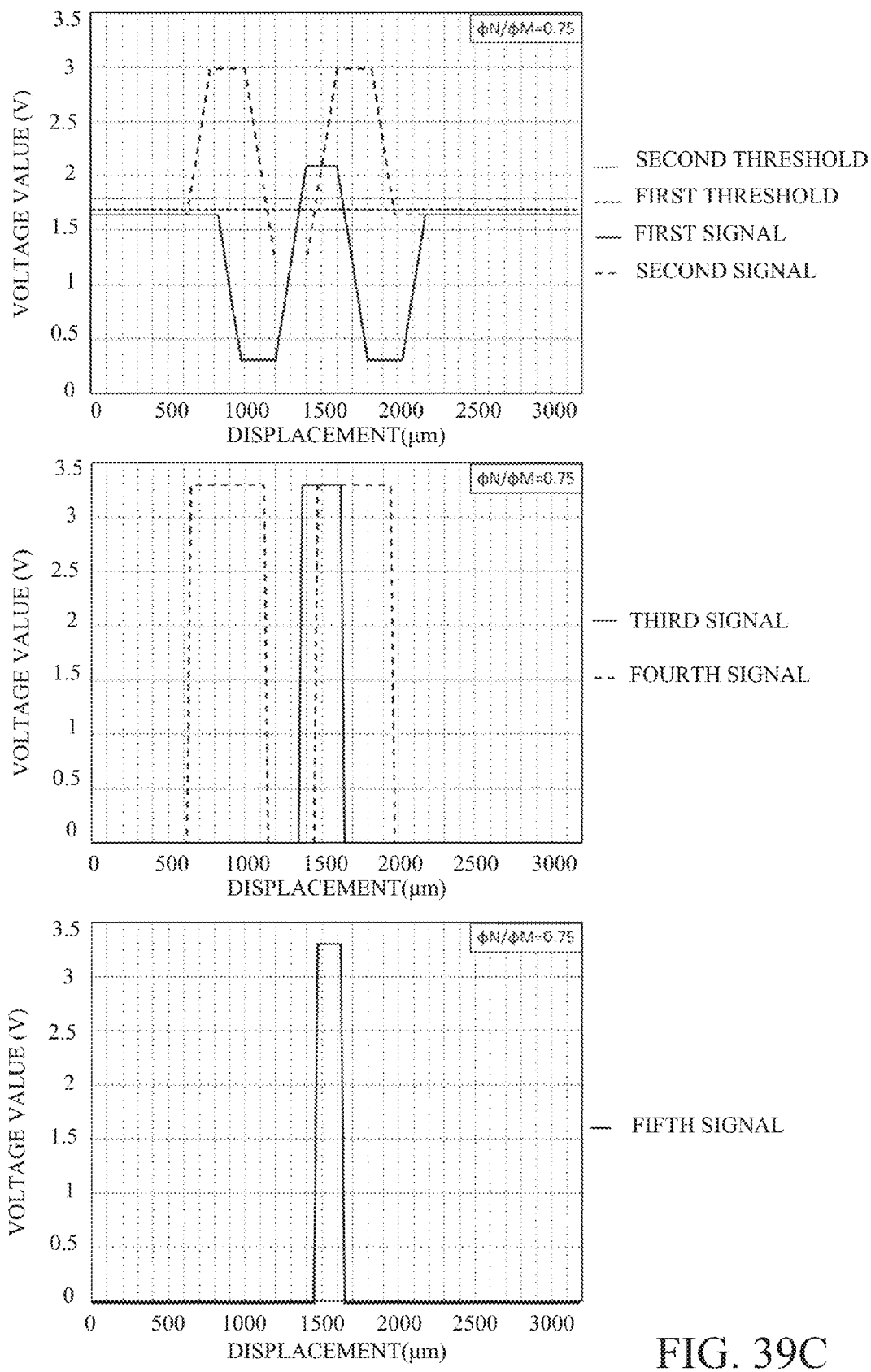
FIG. 39C is a schematic diagram illustrating a first to a fifth signals when a light receiving sensitivity ratio is 0.75.
Figure 39D:
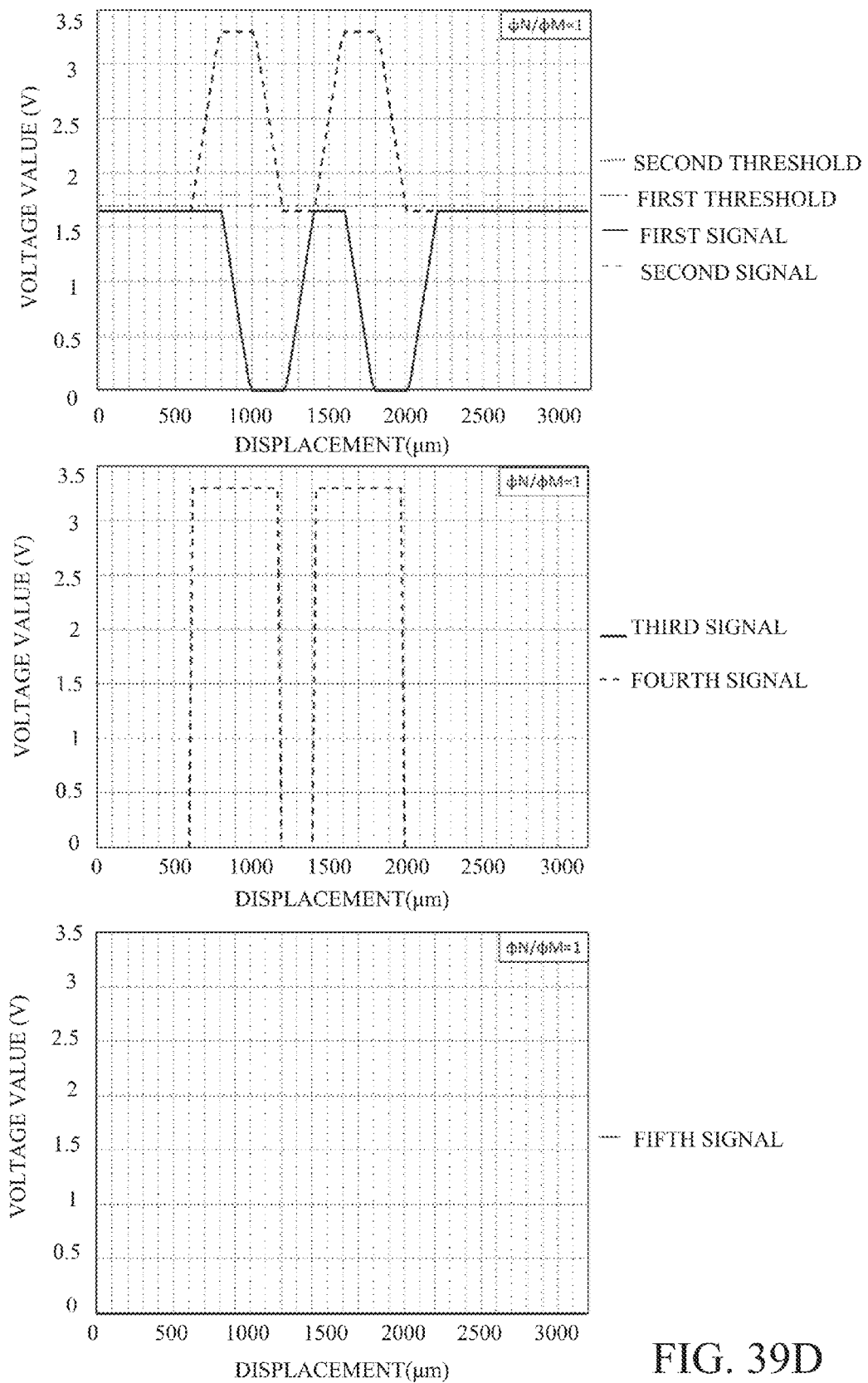
FIG. 39D is a schematic diagram illustrating a first to a fifth signals when a light receiving sensitivity ratio is 1.

FIG. 36 is a schematic diagram illustrating the light receiving part 231 when the light receiving sensitivity (signal sensitivity) ratio $\phi N/\phi M$ is ½. In FIG. 36, since light receiving sensitivity (signal sensitivity) $\phi N$ of the light receiving element arranged at the peripheral part is ½ compared with FIG. 33, the light receiving sensitivity (signal sensitivity) is ½. FIG. 37 is a schematic diagram illustrating signal intensity of each light receiving element when the track 212 is relatively displaced, and FIG. 38 is a schematic diagram illustrating output signal intensity signal after a differential. Since the light receiving sensitivity (signal sensitivity) ratio $\phi N/\phi M$ of the light receiving element arranged at the peripheral part and the light receiving element arranged at the central part is ½, signal intensity variation between the point 0 and the point 4 is different from signal intensity variation between the point 4 and the point 8. The same applies to the other light receiving elements, and if signal intensities of all light receiving elements are combined, combinations of the signal intensities become unique. For example, a range where output signal intensity VA of the light receiving element A and output signal intensity VB of the light receiving element B strengthen than output signal intensity VC of the light receiving element C and output signal intensity VD of the light receiving element D, respectively, is only existed between the point 4 and the point 6. Additionally, each output single intensity after a differential has an unique value, and a range where both differential output signal intensities V1, V2 strengthen than 0 is only existed between the point 4 and the point 6. If this state is a condition of an origin, origin detection is performable.

Figure 40:
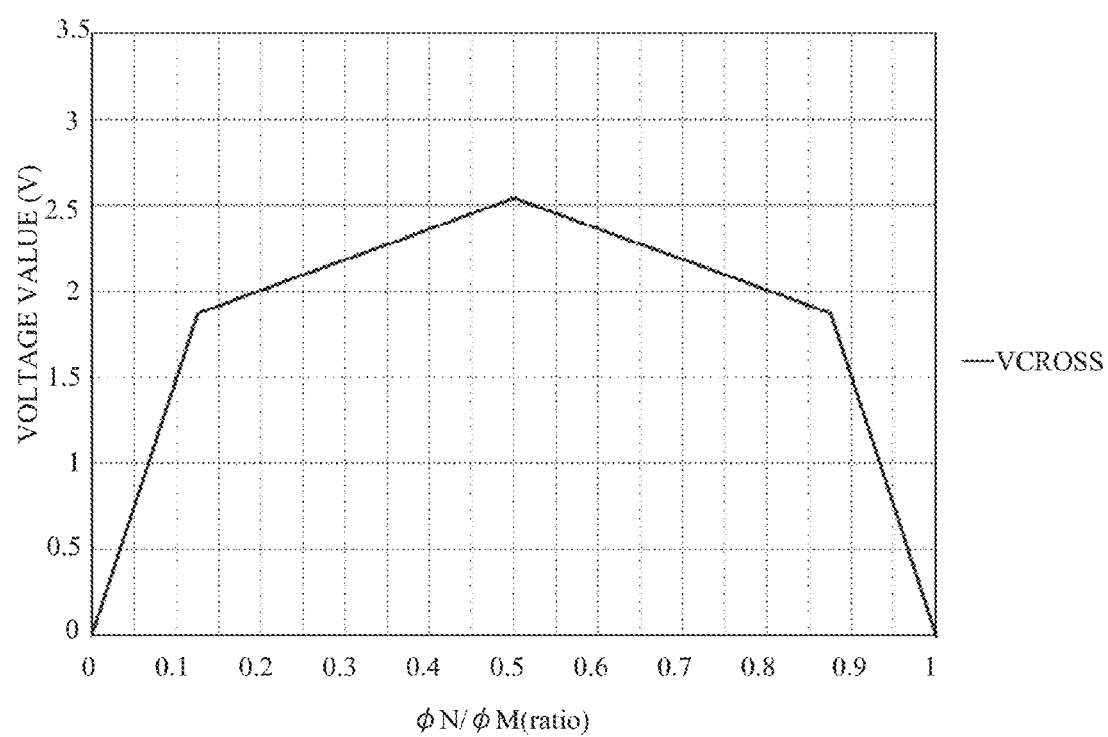
FIG. 40 is a schematic diagram illustrating a relation between a light receiving sensitivity ratio and a cross point voltage value.

FIGS. 39A-39D are schematic diagrams illustrating a first to a fifth signals when light receiving sensitivity (signal sensitivity) ratios $\phi N/\phi M$ are 0.25, 0.5, 0.75, and 1, respectively. In each figure, the abscissa axis denotes displacement, and the ordinate axis denotes a voltage value. As illustrated in these figures, when the light receiving sensitivity (signal sensitivity) is less than 1, there is a range where both the first and second signals is higher than the central voltage and intersection method of each signal changes according to sensitivity ratio. FIG. 40 is a schematic diagram illustrating a relation acquired from FIGS. 39A-39D between a cross point voltage value, which is a mark so as to regard as an origin by an origin signal processing in the invention, and a light receiving sensitivity (signal sensitivity) ratio. In FIG. 40, the abscissa axis denotes light receiving sensitivity (signal sensitivity) ratio $\phi N/\phi M$, and the ordinate axis denotes a voltage value.

As illustrated in FIG. 40, when the light receiving sensitivity (signal sensitivity) ratio is 0.5, the cross point voltage value is the highest. Thus, the light receiving sensitivity (signal sensitivity) is preferable to be 0.5, and the light receiving sensitivity (signal sensitivity) in this embodiment is 0.5.

Figure 41A:
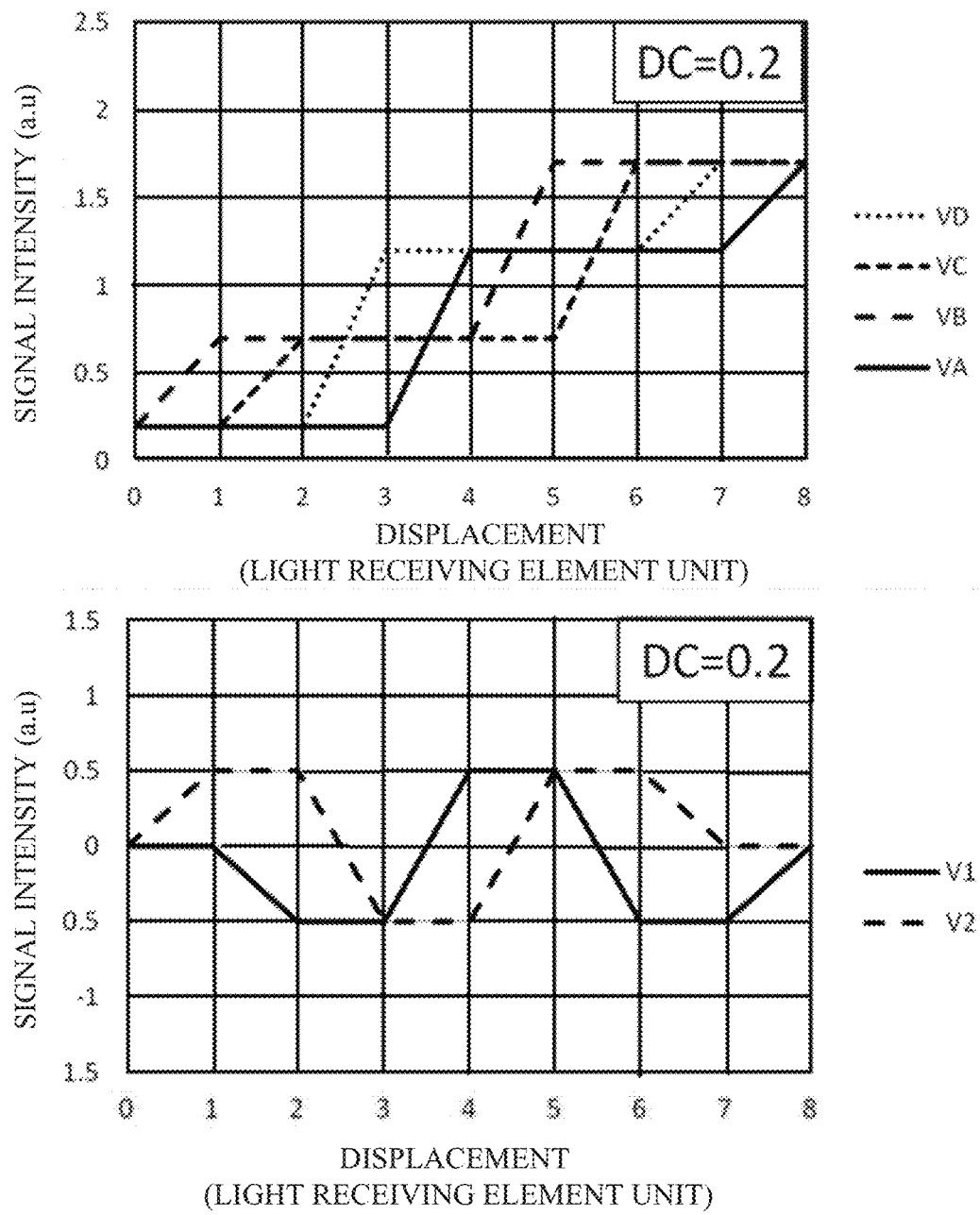
FIG. 41A is a schematic diagram illustrating signal intensity of each light receiving element and signal intensity after a differential when a uniform light is incident.
Figure 41B:
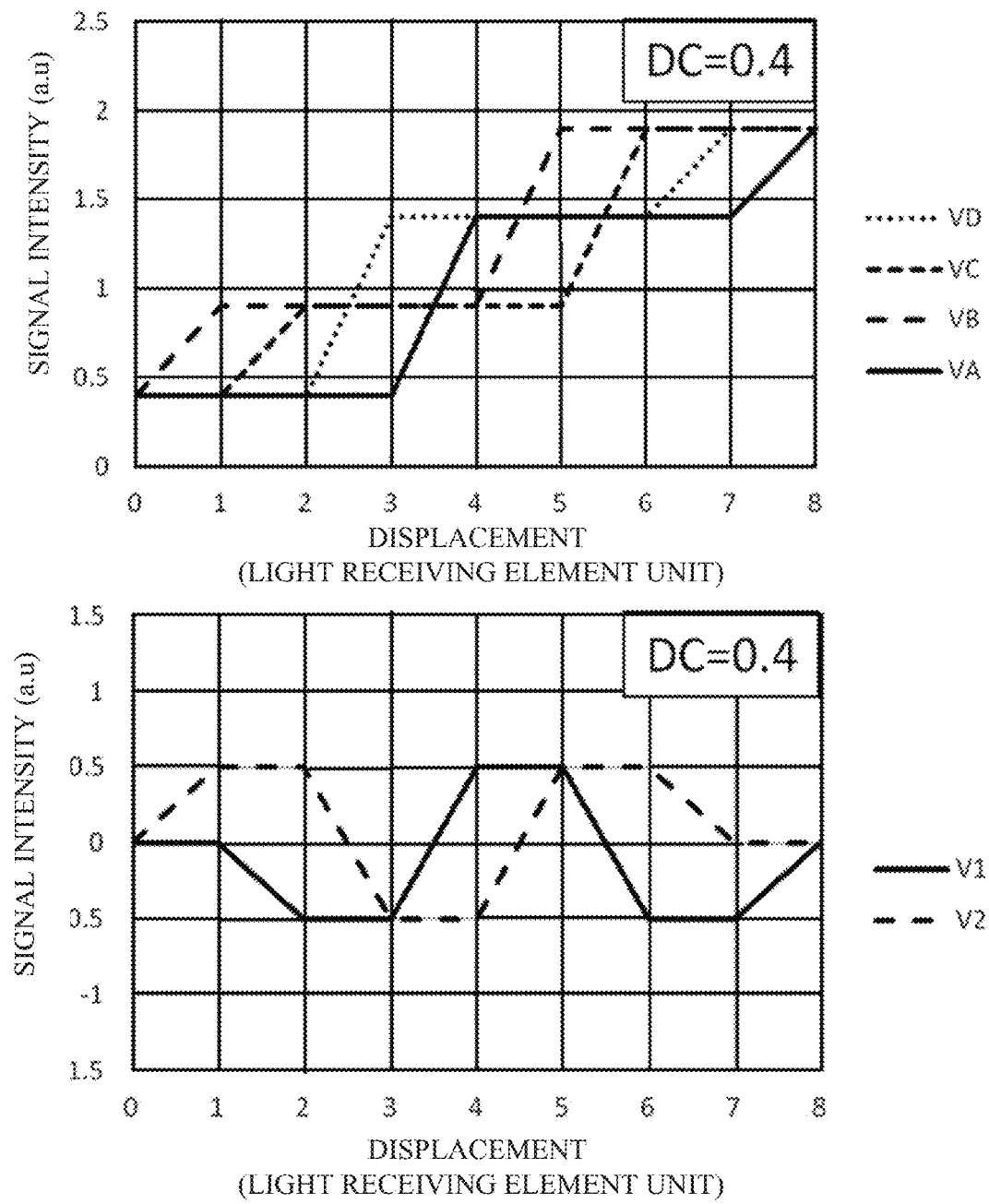
FIG. 41B is a schematic diagram illustrating signal intensity of each light receiving element and signal intensity after a differential when a uniform light is incident.

Signal variation resistance characteristics by a differential processing is an effect of the invention. In an optical type encoder of this embodiment, if a light is uniformly incident to the entire light receiving part 231, all light receiving element indicate the same signal intensity. Hereinafter, the above uniform incident light is "DC light", and the same signal intensity generated by the light receiving elements is "DC component". FIG. 41A is added 0.2 of "DC component", and FIG. 41B is added 0.4 of "DC component". FIGS. 41A and 41B are schematic diagrams illustrating signal intensity of the light receiving elements A-D and signal intensity after a differential. In FIGS. 41A and 41B, the abscissa axis denotes displacement of a light receiving element unit, and the ordinate axis denotes a voltage value.

In figures illustrating signal intensity of each light receiving element in FIGS. 41A and 41B, signal intensity of each light receiving element raise by the value of the "DC component". However, in figures illustrating signal intensity after a differential in FIGS. 41A and 41B, signal intensity does not change even if the value of the "DC component" changes, and thus a signal phase also does not change. The "DC component" added to an output voltage of each light receiving element is removed by a differential processing represented by the expressions (A) and (B).

In this embodiment, preferable origin detection not affected by noise is performable by the above configuration.

In this embodiment, the reflective configuration that the displacement detecting sensor 220, the origin detecting sensor 230, and the light source 221 are arranged on the same surface, and displacement and an origin position are detected by receiving the reflected light from the scale 210 is explained. However, the invention can be applied to the transmissive configuration that each sensor is provided on a plane different from a plane on which the light source 221 is provided and the scale 210 is provided between the light source 221 and each sensor.

Additionally, in this embodiment, a sensor different from the origin detecting sensor for displacement detection is used. Since the configuration of the origin detecting sensor is the same configuration as the displacement detecting sensor except for an arrangement number of the light receiving element array group in this embodiment, the origin detecting sensor of the invention may be used for displacement detection.

Moreover, an origin detection processing is performed using the circuit in this embodiment, but may be performed using a software if a signal similar to the fifth signal can be acquired.

Embodiment 6

Figure 42:
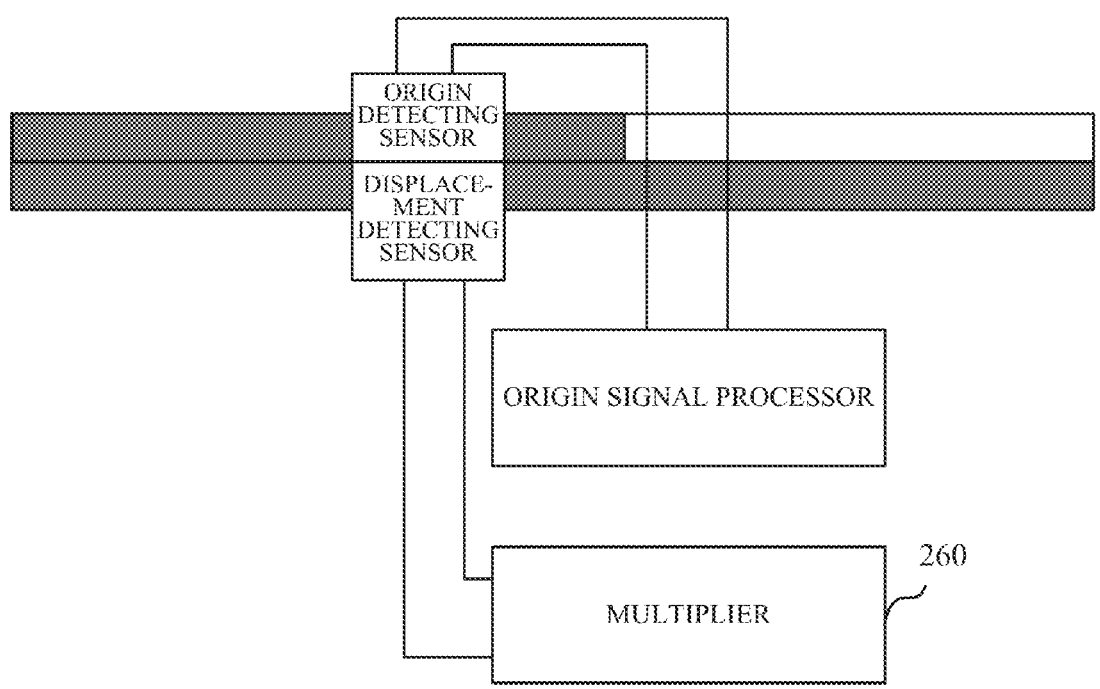
FIG. 42 is a schematic diagram illustrating a configuration of an encoder in Embodiment 6.

In this embodiment, a multiplier 260 is used instead of a displacement detecting signal processor 240 of Embodiment 5. FIG. 42 is a schematic diagram illustrating the configuration of an encoder in this embodiment. A method of an origin detecting processing is the same as Embodiment 5. Additionally, since an operation of the multiplier 260 is the same as the multiplier 60 of Embodiment 2, the detailed explanation thereof is omitted.

A way of dealing with phase differences between an output phase of the displacement detecting sensor 220 and an origin signal output from the origin signal processor 250 is explained. An origin pulse output phase is localized relative to the raised origin signal because the position variation margin width decreases by the phase differences. As a result, the origin pulse is not output at desired position.

In this embodiment, an output position of the origin signal relative to the origin pulse output phase is adjusted. The raised width of the fifth signal, which is the original signal, is determined by the first and second thresholds. For example, if a signal having 100 µm of the raised width is acquired, the first and second thresholds become an intermediate value between the central voltage and the cross point voltage. Because the phase difference between the first and second signals determined by the arrangement of the light receiving elements is always 200 µm at the central voltage, decreases by setting larger thresholds from the central voltage, and becomes 0 at an intersectional position where the first and second signals intersect. Since the first and second signals are linear from the central voltage to the cross point voltage, a relation between the origin signal raised width and the thresholds is represented as the following expression (15). λ represents the origin signal raised width, and X represents the phase difference between the first and second signals at the central voltage. For simplification, Vref1=Vref2=Vref and Voffset1=Voffset2=Voffset are satisfied.

$$\lambda = X \times \frac{Vcross - Vref}{Vcross - Voffset} \quad (15)$$

Figure 43A:
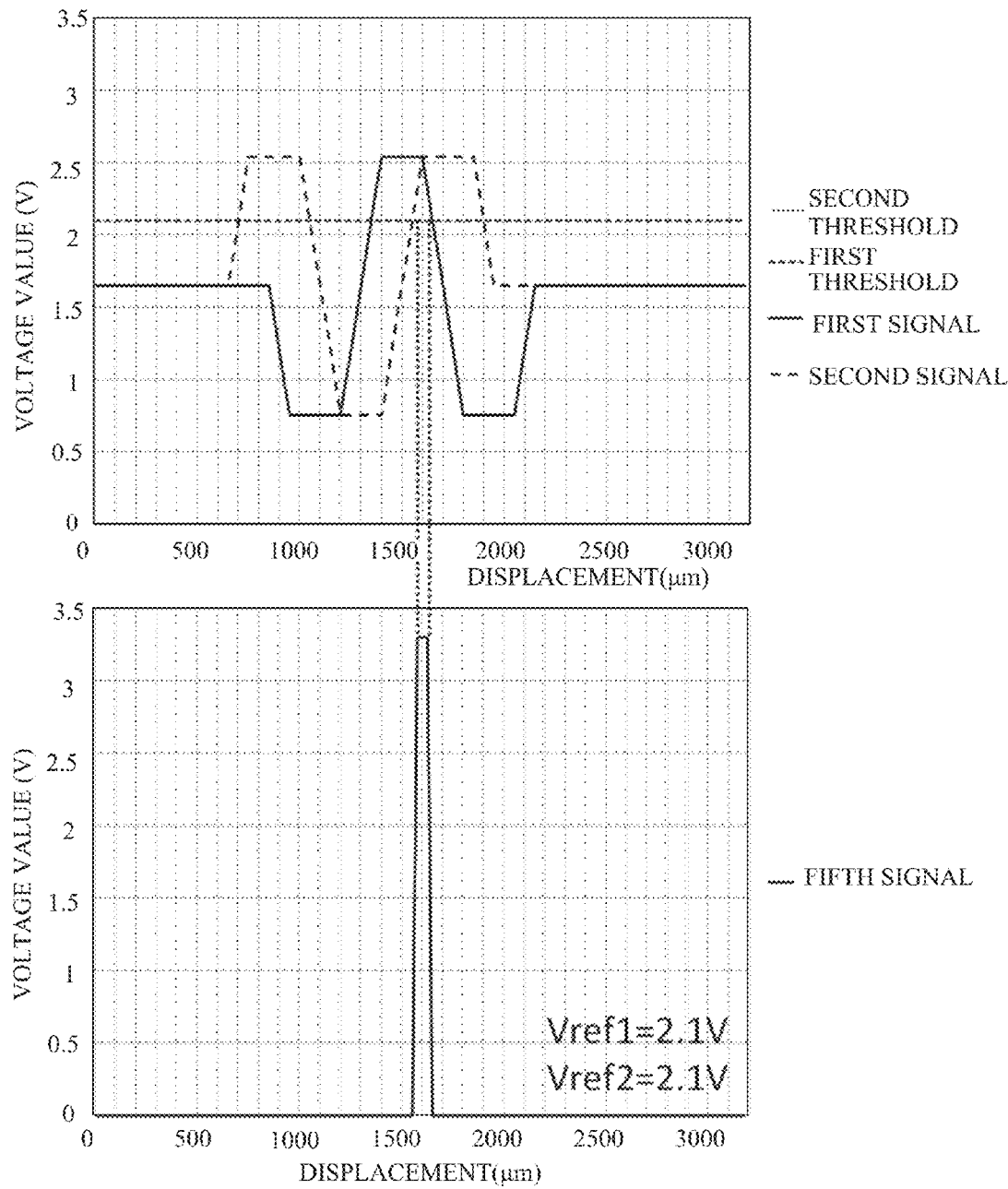
FIG. 43A is a schematic diagram illustrating a first signal, a second signal, and a fifth signal if a first threshold is equal to a second threshold.
Figure 43B:
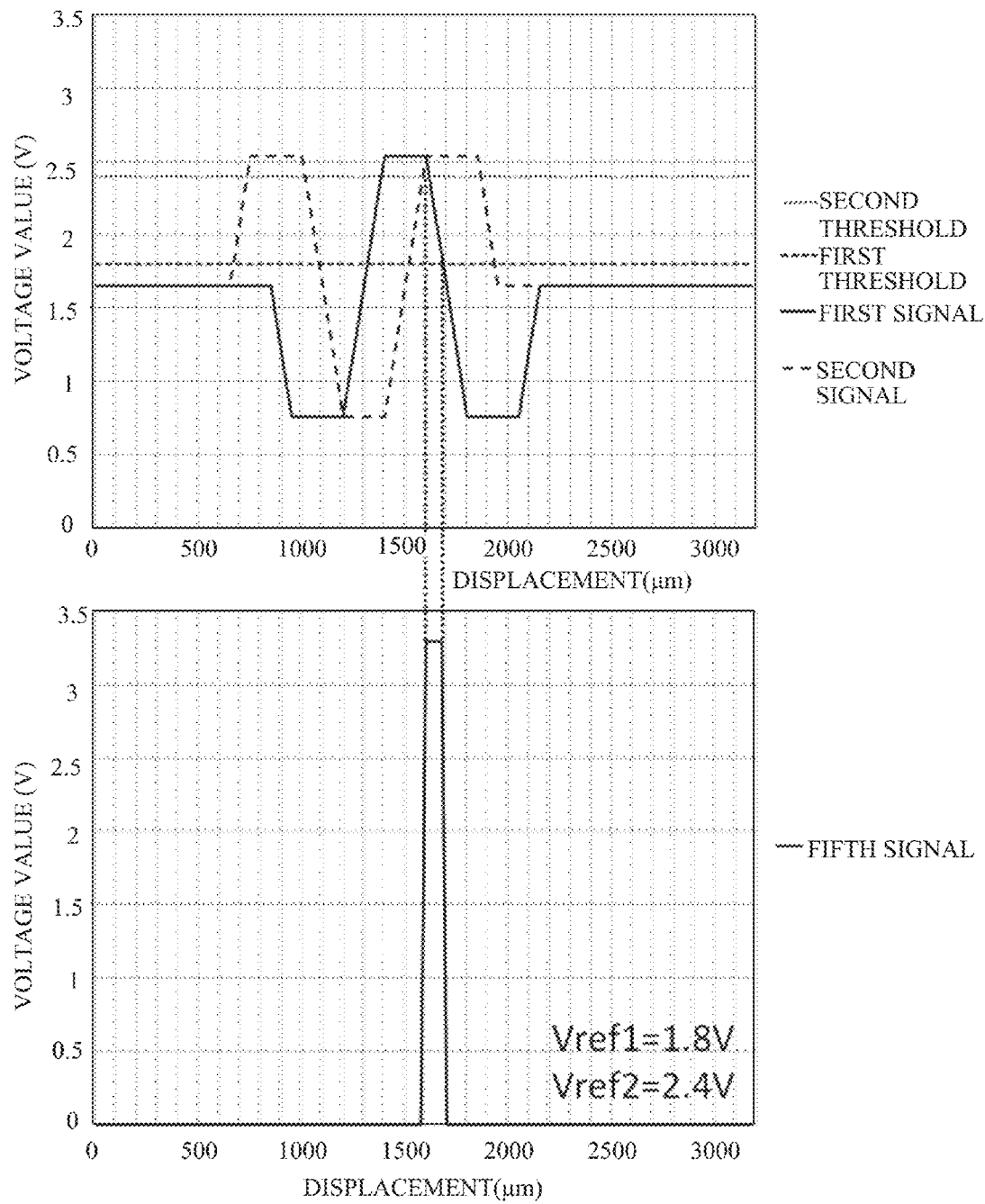
FIG. 43B is a schematic diagram illustrating a first signal, a second signal, and a fifth signal if a first threshold is on a low voltage side and a second threshold is on a high voltage side.
Figure 43C:
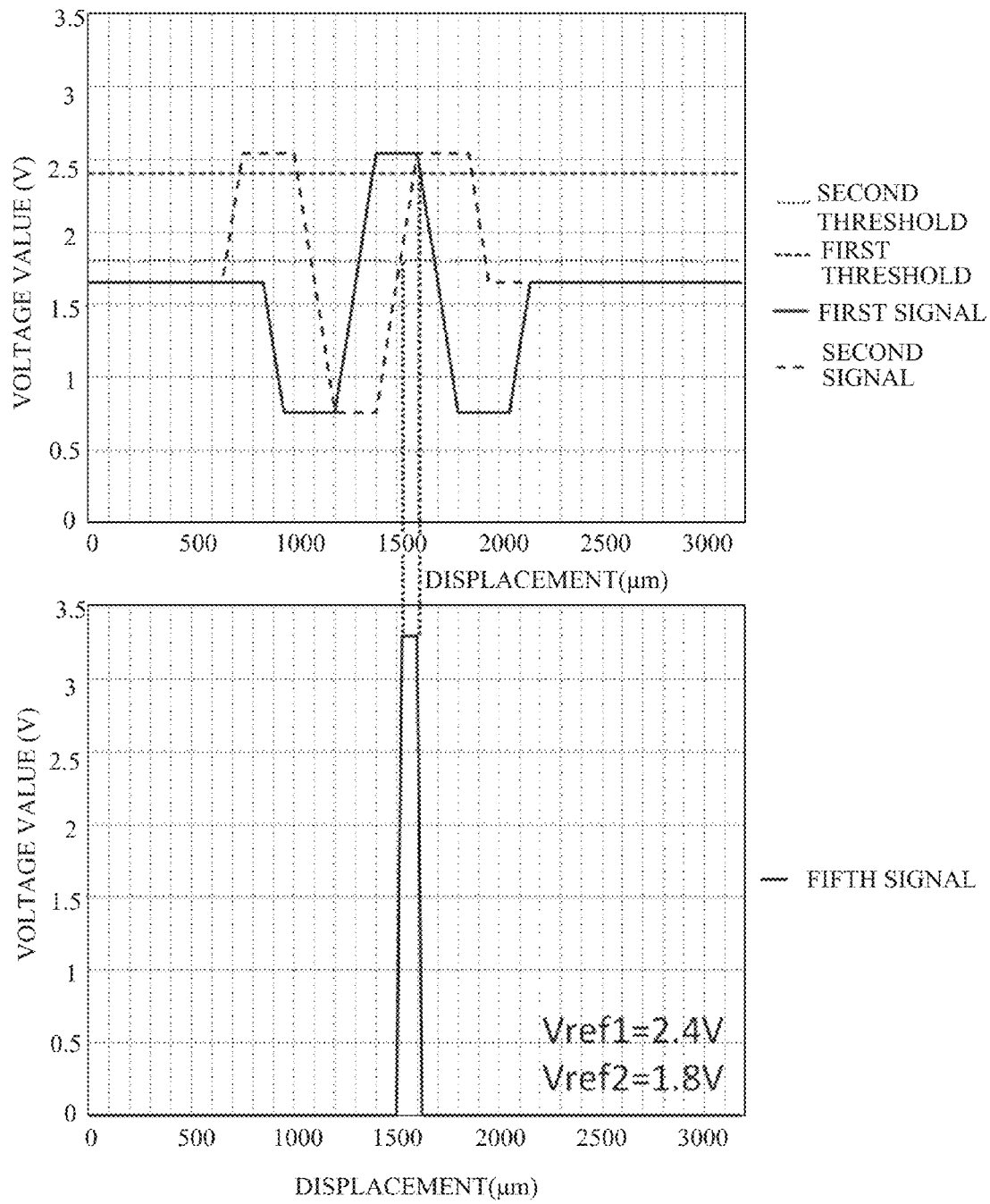
FIG. 43C is a schematic diagram illustrating a first signal, a second signal, and a fifth signal if a first threshold is on a high voltage side and a second threshold is on a low voltage side.

When position of the fifth signal being the origin signal is adjusted in this configuration, the first and second thresholds being respectively thresholds of the first and second signals are individually reversely varied. FIGS. 43A-43C are schematic diagrams illustrating the first, second, and fifth signals if the first and second thresholds are changed from the state that the first threshold is equal to the second threshold. For example, when the origin position moves to the right (from the state of FIG. 43A to the state of FIG. 43B), the first and second thresholds Vref1 and Vref2 are changed to the low voltage side and the high voltage side, respectively. Conversely, when the origin position moves to the left (from the state of FIG. 43A to the state of FIG. 43C), the first and second thresholds are changed to the high voltage side and the low voltage side, respectively. An absolute value of a change of each threshold may be then equivalence. When the absolute values of a change of the thresholds differ from each other, the origin signal width decreases or increases in width compared to the origin signal width of Vref1=Vref2.

When the origin position, where Vref1=Vref2=Vref is satisfied, is an initial position, an adjustment width ΔOrg of the origin position is represented by the following expression (16).

$$\Delta Org = \begin{cases} \pm \frac{\lambda}{2} & Vcross - Vref \le Vref - Voffset \\ \pm \frac{X - \lambda}{2} & Vcross - Vref > Vref - Voffset \end{cases} \quad (16)$$

Further, in light of a central voltage fluctuation factor Vom and a cross point voltage fluctuation factor vcm, the expression (16) is rewritten to the following expression (17).

$$\Delta Org = \qquad (17)$$

$$\begin{cases} \pm \frac{\lambda}{2}\left(1 - \frac{Vcm}{Vcross - Vref}\right) & Vcross - Vref < Vref - Voffset \\ \pm \frac{\lambda}{2}\left(1 - \frac{\frac{Vcm}{Vcross - Vref}}{\frac{Vom}{Vref - Voffset}}\right) & Vcross - Vref = Vref - Voffset \\ \pm \frac{X - \lambda}{2}\left(1 - \frac{Vom}{Vfref - Voffset}\right) & Vcross - Vref > Vref - Voffset \end{cases}$$

From the above configuration, since the output position of the origin signal is adjustable in a state where the multiplier 260 is connected, the origin detecting processing of the invention is applied to the system outputting the origin pulse using the origin signal synchronized to the displacement detecting signal. The invention according to this embodiment is also applied to the system where the signal detecting configuration and the processing configuration are separately provided as Embodiment 5.

Embodiment 7

Figure 44:
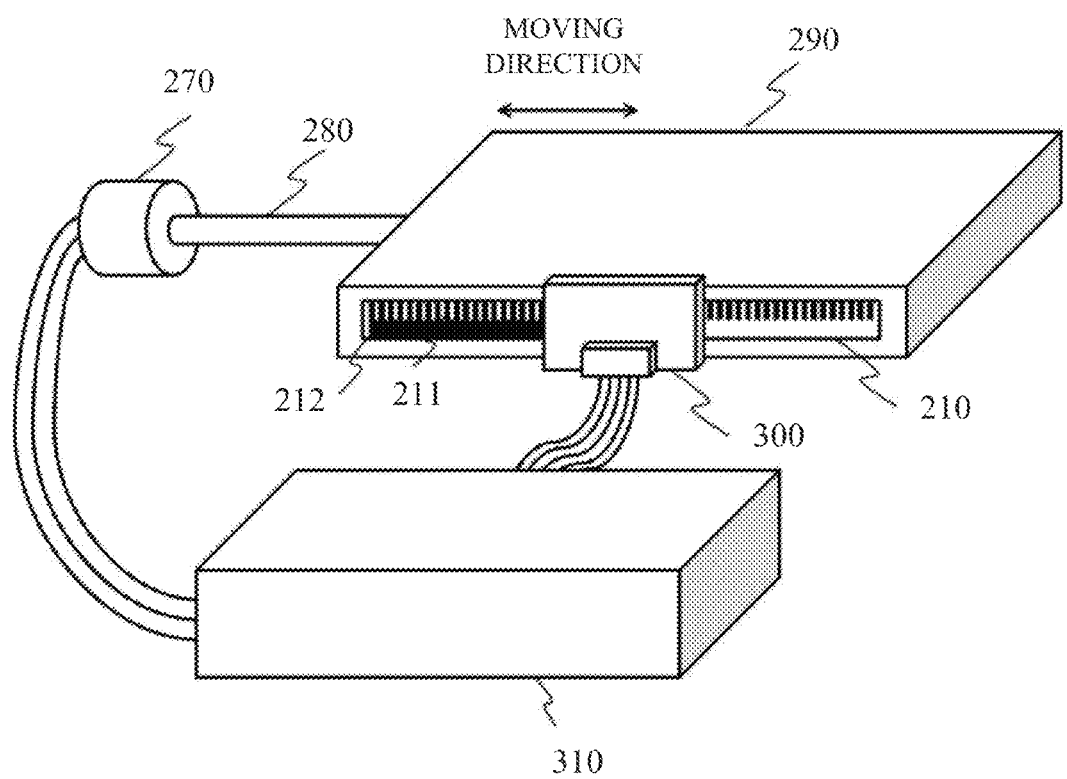
FIG. 44 is a schematic diagram illustrating a linear stage in Embodiment 7.

FIG. 44 is a schematic diagram illustrating a linear stage according to this embodiment. The linear stage includes a scale 210, a motor 270, a ball screw 280, a stage 290, an encoder 300, and a controller 310. The encoder 300 includes the displacement detecting sensor 220, the origin detecting sensor 230, the displacement detecting signal processor 240, and the origin signal processor 250 of Embodiment 5. Additionally, the encoder 300 is a reflective type optical encoder as other embodiments.

The ball screw 280 is capable of converting a rotating motion of the motor 270 into a linear motion, and the stage 290 moves in a moving direction of FIG. 44 according to rotating amounts of the motor 270 by the ball screw 280. The scale 210 is attached to a side surface of the stage 290 so as to detect along a uniaxial moving direction, and the encoder 300 is mounted so as to read the scale 210. The controller 310 detects displacement of the stage 290 based on a signal from the encoder 300, and controls a position of the stage 290 by controlling rotating amounts of the motor 270.

Displacement detection is performed by the displacement detecting sensor 220 of the encoder 300 and the pattern for displacement detection of the track 211 of the scale 210. The displacement detecting sensor 220 outputs two phase sinusoidal signals according to relative displacement from the scale 210, and the encoder 300 converts it into a position signal so as to transmit to the controller 310.

In this configuration, the controller 310 needs to receive displacement from a standard position of the stage 290. This is for avoiding a false operation that the controller 310 continues to rotate the motor 270 by mistaking reaching of the stage 290 to the limit position in the uniaxial moving direction. A limit sensor may be used so as to receive the limit position in the uniaxial moving direction, but is not used in this embodiment because components increase by providing the limit sensor in addition to the encoder 300. The components are the encoder 300 and peripheral circuit components of the limit sensor.

In this embodiment, a pattern for origin detection of the track 212 as a reference of an absolute position is prepared in the scale 210 apart from the pattern for displacement detection of the track 211, and is detected by the origin detecting sensor 230 of the encoder 300.

In this embodiment, when power is supplied, origin detection for searching an origin pattern is performed by moving the stage 290 so as to detect an origin. When the pattern for origin detection reaches on the origin detecting sensor 230 of the encoder 300, the fifth signal as the origin signal is transmitted to the controller 310 through the origin signal processor 250. The controller 310 recognizes that the stage 290 is positioned at the origin by receiving the origin signal, and then resets the detecting position to 0. After then, displacement detection regarded a region where the pattern for origin detection exists as the origin position is performable, and thus the stage 290 is capable of being accurately controlled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2014-026113, filed on Feb. 14, 2014, and 2014-052658, filed on Mar. 14, 2014, which are hereby incorporated by reference herein in their entirety.

What is claimed is:

1. An encoder comprising:
a scale including an origin detecting pattern;
an origin detector reading the origin detecting pattern; and
a processor outputting an origin signal,
wherein the origin detector includes a plurality of detecting element groups,
wherein each detecting element group includes at least a first detector, a second detector, a third detector, and a fourth detector, the first and second detectors and the third and fourth detectors being symmetrically arranged to a center of each detecting element group, respectively,
wherein the origin detecting pattern is configured so that a length along a detecting direction of a part, which is detected by the origin detector and has a physical characteristic different from an origin peripheral part, is shorter than a length along the detecting direction of each detecting element groups,
wherein the origin detector outputs a first signal based on the first and third detectors, and a second signal based on the second and fourth detectors, and
wherein the processor acquires a third signal by processing the first signal and a first threshold, and a fourth signal by processing the second signal and a second threshold, and outputs a fifth signal acquired by processing the third and fourth signals as the origin signal.

2. The encoder according to claim 1, wherein the processor changes the first or second threshold so as to adjust an output position of the origin signal.

3. The encoder according to claim 1, further comprising a displacement detector which outputs a displacement detecting signal by reading a displacement detecting pattern formed on the scale,
wherein the displacement detecting pattern and the origin detecting pattern are formed on different tracks, and
wherein the origin detector and the displacement detector read the origin detecting pattern and the displacement detecting pattern, respectively.

4. The encoder according to claim 3, wherein the origin signal used for origin detection is asynchronous with respect to the displacement detecting signal.

5. The encoder according to claim 3, wherein the origin signal used so as to output an origin pulse used for origin detection is synchronous with respect to the displacement detecting signal.

6. The encoder according to claim 1, further comprising a displacement detector which outputting a displacement detecting signal by reading a displacement detecting pattern, which is formed on the scale and includes a resolution different from a resolution of the origin detecting pattern,
wherein the displacement detecting pattern and the origin detecting pattern are formed on the same track, and
wherein the origin detector and the displacement detector read an optical signal combining a reflected light from the displacement detecting pattern and a reflected light from the origin detecting pattern.

7. The encoder according to claim 6, wherein the origin signal used for origin detection is asynchronous with respect to the displacement detecting signal.

8. The encoder according to claim 6, wherein the origin signal used so as to output an origin pulse utilized for origin detection is synchronous with respect to the displacement detecting signal.

9. An apparatus comprising the encoder according to claim 1.

10. An encoder comprising:
a scale including an origin detecting pattern;
an origin detector reading the origin detecting pattern; and
a processor outputting an origin signal,
wherein the origin detector includes a plurality of detecting element groups,
wherein each detecting element group includes at least a first detector, a second detector, a third detector, and a fourth detector,
wherein the origin detector is configured so that a first signal sensitivity of detectors distributed at a central part of the plurality of detecting element group is larger than a second signal sensitivity of detectors distributed at a peripheral part of the plurality of detecting element group,
wherein the origin detecting pattern has an origin pattern so that a length along a detecting direction of the origin pattern, which is detected by the origin detector and has a physical characteristic different from an origin peripheral part, is larger than a length along the detecting direction of each detecting element group,
wherein the origin detector outputs a first signal based on the first and third detectors, and a second signal based on the second and fourth detectors, and
wherein the processor acquires a third signal by processing the first signal and a first threshold, and a fourth signal by processing the second signal and a second threshold, and outputs a fifth signal acquired by processing the third and fourth signals as the origin signal.

11. The encoder according to claim 10,
wherein the origin detector includes a first detecting element group and a second detecting element group, which are arranged along the detecting direction,
wherein the first detecting element group, in order from an end, includes the first and second detectors having the second sensitivity and the third and fourth detectors having the first sensitivity, and wherein the second detecting element group, in order from a fourth detector side of the first detecting element group, the first and second detectors having the first sensitivity and the third and fourth detectors having the second sensitivity.

12. The encoder according to claim 10, wherein the processor changes the first or second threshold so as to adjust an output position of the origin signal.

13. The encoder according to claim 10, wherein the first and second thresholds are the same value.

14. The encoder according to claim 10, further comprising a displacement detector which outputs a displacement detecting signal by reading a displacement detecting pattern formed on the scale, wherein the displacement detecting pattern and the origin detecting pattern are formed on different tracks, and wherein the origin detector and the displacement detector read the origin detecting pattern and the displacement detecting pattern, respectively.

15. The encoder according to claim 14, wherein the origin signal used for origin detection is asynchronous with respect to the displacement detecting signal.

16. The encoder according to claim 14, wherein the origin signal used so as to output an origin pulse utilized for origin detection is synchronous with respect to the displacement detecting signal.

17. An apparatus comprising the encoder according to claim 10.

* * * * *